US012726741B2

(12) United States Patent
Szczerban Gonzalez et al.

(10) Patent No.: US 12,726,741 B2
(45) Date of Patent: Sep. 1, 2026

(54) OPTICAL NODE ARCHITECTURES FOR OPTICAL COMMUNICATION SYSTEMS

(71) Applicant: Nokia Solutions and Networks Oy, Espoo (FI)

(72) Inventors: Mijail Szczerban Gonzalez, North Plainfield, NJ (US); John E. Simsarian, Highland Park, NJ (US); Roland Ryf, Aberdeen, NJ (US); Colin Kelly, Hubbards (CA)

(73) Assignee: Nokia Solutions and Networks Oy, Espoo (FI)

( * ) Notice: Subject to any disclaimer, the term of this patent is extended or adjusted under 35 U.S.C. 154(b) by 349 days.

(21) Appl. No.: 18/463,861

(22) Filed: Sep. 8, 2023

(65) Prior Publication Data

US 2025/0088776 A1 Mar. 13, 2025

(51) Int. Cl.
*H04Q 11/00* (2006.01)

(52) U.S. Cl.
CPC ... *H04Q 11/0005* (2013.01); *H04Q 2011/006* (2013.01)

(58) Field of Classification Search
CPC .................................................. H04Q 11/0005
(Continued)

(56) References Cited

U.S. PATENT DOCUMENTS 4,394,541 A 7/1983 Seiden
8,000,267 B2 * 8/2011 Solis ...................... H04L 45/54 370/256

(Continued)

FOREIGN PATENT DOCUMENTS

EP 3146657 B1 * 9/2019 ......... H04Q 11/0003
JP 3976602 B2 * 9/2007 .......... H04J 14/0241

(Continued)

OTHER PUBLICATIONS

Yahya, Muhammad Rehan et al., “An Algorithmic Framework to Construct Optical Switch via Scaling from N-to-2N Ports for Optical Network on Chip,” in IEEE Access, vol. 7, pp. 101427-101440, 2019, doi: 10.1109/ACCESS.2019.2930754.

(Continued)

*Primary Examiner* — Amritbir K Sandhu
(74) *Attorney, Agent, or Firm* — Nokia Technologies Oy

(57) ABSTRACT

Various example embodiments of optical nodes may be configured to support improved connectivity between optical fibers and/or cores of optical fibers connected to the optical nodes based on use of various optical cross-connect architectures within the optical nodes. Various example embodiments of optical nodes configured to support use of various optical cross-connect architectures within the optical nodes in order to provide improved connectivity within the optical nodes in a manner that supports improved connectivity between optical fibers and/or cores of optical fibers connected to the optical nodes may be configured to support optical cross-connect architectures that increase connectivity between middle stage switches of the optical nodes (e.g., use of an auxiliary optical switch to increase connectivity between middle stage switches, use of connections between middle stage switches to increase connectivity between middle stage switches, or the like, as well as various combinations thereof).

3 Claims, 13 Drawing Sheets

(58) Field of Classification Search
USPC .............................................................. 398/50
See application file for complete search history.

(56) References Cited

U.S. PATENT DOCUMENTS

| | | | |
|---|---|---|---|
| 8,040,821 B2 | 10/2011 | Junichi et al. | |
| 9,210,487 B1 | 12/2015 | Xiaoxue et al. | |
| 2003/0063839 A1 | 4/2003 | Scott et al. | |
| 2010/0085979 A1* | 4/2010 | Liu | H04L 45/48 370/408 |
| 2012/0128347 A1* | 5/2012 | Sakamoto | H04J 14/0213 398/48 |
| 2015/0036971 A1* | 2/2015 | Way | G02B 6/35 385/17 |
| 2015/0195189 A1* | 7/2015 | Winzer | H04L 45/20 709/241 |
| 2022/0329340 A1 | 10/2022 | Hamid et al. | |
| 2025/0088776 A1* | 3/2025 | Szczerban Gonzalez | H04Q 11/0005 |

FOREIGN PATENT DOCUMENTS

| | | | | |
|---|---|---|---|---|
| JP | 4208842 B2 * | 1/2009 | H04J 14/0283 |
| WO | 2019096750 A1 | 5/2019 | |
| WO | WO-2019235392 A1 * | 12/2019 | H04Q 3/52 |

OTHER PUBLICATIONS

Hassen, Fadoua et al., "High-capacity clos-network switch for data center networks," 2017 IEEE International Conference on Communications (ICC), Paris, France, 2017, pp. 1-7, doi: 10.1109/ICC.2017.7997147.

Jinno, Masahiko, "Spatial Channel Network (SCN): Opportunities and Challenges of Introducing Spatial Bypass Toward the Massive SDM Era [Invited]," J. Opt. Commun. Netw. 11, 1-14 (2019).

Simsarian, John et al., "Add/Drop Capability for Spatial Division Multiplexed Optical Systems," U.S. Appl. No. 17/965,236, filed Oct. 13, 2022.

* cited by examiner

630

720

OPTICAL NODE ARCHITECTURES FOR OPTICAL COMMUNICATION SYSTEMS

TECHNICAL FIELD

Various example embodiments relate generally to communication systems and, more particularly but not exclusively, to optical communication systems.

BACKGROUND

In optical systems, wavelength division multiplexing (WDM) may be employed to multiplex multiple optical carrier signals onto a single optical fiber using different wavelengths.

In a WDM-based optical system, reconfigurable optical add/drop multiplexers (ROADMs) may be used to switch traffic from the WDM-based optical system at the wavelength level, thereby allowing individual wavelengths or multiple wavelengths to be added to and/or dropped from transport fibers without having to convert the signals to electronic signals and back to optical signals. Many ROADM-based WDM optical systems add and drop wavelengths using a colorless, directionless, contentionless, and flexible (CDCF) add/drop section architecture such that an optical signal plugged into any port of the CDCF add/drop section can have any wavelength (i.e., colorless) and can go in any direction (i.e., directionless), without wavelength contention (i.e., contentionless).

In optical communication systems, the Shannon capacity limit of certain bands (e.g., the "conventional wavelength" communication band (referred to as the C band) and the "long wavelength" communication band (referred to as the L band)) is being approached. In order to support future capacity growth of optical communication systems as the Shannon capacity limit of such bands is approached, many optical communication systems will be scaling in the spatial domain based on use of spatial division multiplexing (SDM) techniques (e.g., based on use of multiple fibers and/or multiple cores per fiber). This scaling in the spatial domain based on use of multiple fibers and/or multiple cores per fiber will provide improved capacity within optical communication systems, but also provides a new dimension to optical communication systems that will need to be properly designed, configured, controlled, and managed in order to properly support the increased capacity in the optical communication systems.

SUMMARY

In at least some example embodiments, an apparatus includes a set of optical switches including a set of optical input ports and a set of optical output ports, wherein the optical switches are at least partially optically interconnected to optically switch optical communications between the optical input ports and the optical output ports. In at least some example embodiments, the optical switches are directly interconnected to optically switch optical communications between the optical input ports and the optical output ports. In at least some example embodiments, the optical switches are configured to be directly interconnected in a full mesh architecture providing interconnectivity between each pair of optical switches in the set of optical switches. In at least some example embodiments, the full mesh of interconnections between the optical switches includes respective pairs of duplex connections between each pair of optical switches in the set of optical switches.

In at least some example embodiments, the optical switches are configured to be directly connected in a ring architecture providing interconnectivity between adjacent pairs of optical switches in the set of optical switches. In at least some example embodiments, the ring architecture is a duplex architecture supporting a first ring of connectivity for the adjacent pairs of optical switches in a first direction and a second ring of connectivity for the adjacent pairs of optical switches in a second direction, wherein the first direction and the second direction are opposite to each other. In at least some example embodiments, the optical switches are configured to be indirectly interconnected, via an auxiliary optical switch, to optically switch optical communications between the optical input ports and the optical output ports. In at least some example embodiments, the auxiliary optical switch is configured to support, for each of the optical switches, a respective pair of duplex connections for the respective optical switch configured to support bidirectional connectivity between the auxiliary optical switch and the respective optical switch. In at least some example embodiments, the set of optical switches is disposed as a middle stage in an optical Clos network that includes the middle stage and at least one of an ingress stage or an egress stage. In at least some example embodiments, the apparatus further includes at least one of a set of ingress optical switches configured to be connected to the set of optical input ports of the optical switches or a set of egress optical switches configured to be connected to the set of optical output ports of the optical switches.

In at least some example embodiments, a non-transitory computer readable medium stores computer program instructions which, when executed by an apparatus, cause the apparatus to perform receiving, by a set of optical switches including a set of optical input ports and a set of optical output ports, a set of optical signals, wherein the optical switches are at least partially optically interconnected to optically switch optical communications between the optical input ports and the optical output ports and switching, by the set of optical switches, the set of optical signals from the set of optical input ports to the set of optical output ports. In at least some example embodiments, the optical switches are directly interconnected to optically switch optical communications between the optical input ports and the optical output ports. In at least some example embodiments, the optical switches are configured to be directly interconnected in a full mesh architecture providing interconnectivity between each pair of optical switches in the set of optical switches. In at least some example embodiments, the full mesh of interconnections between the optical switches includes respective pairs of duplex connections between each pair of optical switches in the set of optical switches. In at least some example embodiments, the optical switches are configured to be directly connected in a ring architecture providing interconnectivity between adjacent pairs of optical switches in the set of optical switches. In at least some example embodiments, the ring architecture is a duplex architecture supporting a first ring of connectivity for the adjacent pairs of optical switches in a first direction and a second ring of connectivity for the adjacent pairs of optical switches in a second direction, wherein the first direction and the second direction are opposite to each other. In at least some example embodiments, the optical switches are configured to be indirectly interconnected, via an auxiliary optical switch, to optically switch optical communications between the optical input ports and the optical output ports. In at least some example embodiments, the auxiliary optical switch is configured to support, for each of the optical switches, a respective pair of duplex connections for the respective optical switch configured to support bidirectional connectivity between the auxiliary optical switch and the respective optical switch. In at least some example embodiments, the set of optical switches is disposed as a middle stage in an optical Clos network that includes the middle stage and at least one of an ingress stage or an egress stage. In at least some example embodiments, switching of optical communications is based on at least one of a set of ingress optical switches configured to be connected to the set of optical input ports of the optical switches or a set of egress optical switches configured to be connected to the set of optical output ports of the optical switches.

In at least some example embodiments, a method includes receiving, by a set of optical switches including a set of optical input ports and a set of optical output ports, a set of optical signals, wherein the optical switches are at least partially optically interconnected to optically switch optical communications between the optical input ports and the optical output ports and switching, by the set of optical switches, the set of optical signals from the set of optical input ports to the set of optical output ports. In at least some example embodiments, the optical switches are directly interconnected to optically switch optical communications between the optical input ports and the optical output ports. In at least some example embodiments, the optical switches are configured to be directly interconnected in a full mesh architecture providing interconnectivity between each pair of optical switches in the set of optical switches. In at least some example embodiments, the full mesh of interconnections between the optical switches includes respective pairs of duplex connections between each pair of optical switches in the set of optical switches. In at least some example embodiments, the optical switches are configured to be directly connected in a ring architecture providing interconnectivity between adjacent pairs of optical switches in the set of optical switches. In at least some example embodiments, the ring architecture is a duplex architecture supporting a first ring of connectivity for the adjacent pairs of optical switches in a first direction and a second ring of connectivity for the adjacent pairs of optical switches in a second direction, wherein the first direction and the second direction are opposite to each other. In at least some example embodiments, the optical switches are configured to be indirectly interconnected, via an auxiliary optical switch, to optically switch optical communications between the optical input ports and the optical output ports. In at least some example embodiments, the auxiliary optical switch is configured to support, for each of the optical switches, a respective pair of duplex connections for the respective optical switch configured to support bidirectional connectivity between the auxiliary optical switch and the respective optical switch. In at least some example embodiments, the set of optical switches is disposed as a middle stage in an optical Clos network that includes the middle stage and at least one of an ingress stage or an egress stage. In at least some example embodiments, switching of optical communications is based on at least one of a set of ingress optical switches configured to be connected to the set of optical input ports of the optical switches or a set of egress optical switches configured to be connected to the set of optical output ports of the optical switches.

In at least some example embodiments, an apparatus includes means for receiving, by a set of optical switches including a set of optical input ports and a set of optical output ports, a set of optical signals, wherein the optical switches are at least partially optically interconnected to optically switch optical communications between the optical input ports and the optical output ports and means for switching, by the set of optical switches, the set of optical signals from the set of optical input ports to the set of optical output ports. In at least some example embodiments, the optical switches are directly interconnected to optically switch optical communications between the optical input ports and the optical output ports. In at least some example embodiments, the optical switches are configured to be directly interconnected in a full mesh architecture providing interconnectivity between each pair of optical switches in the set of optical switches. In at least some example embodiments, the full mesh of interconnections between the optical switches includes respective pairs of duplex connections between each pair of optical switches in the set of optical switches. In at least some example embodiments, the optical switches are configured to be directly connected in a ring architecture providing interconnectivity between adjacent pairs of optical switches in the set of optical switches. In at least some example embodiments, the ring architecture is a duplex architecture supporting a first ring of connectivity for the adjacent pairs of optical switches in a first direction and a second ring of connectivity for the adjacent pairs of optical switches in a second direction, wherein the first direction and the second direction are opposite to each other. In at least some example embodiments, the optical switches are configured to be indirectly interconnected, via an auxiliary optical switch, to optically switch optical communications between the optical input ports and the optical output ports. In at least some example embodiments, the auxiliary optical switch is configured to support, for each of the optical switches, a respective pair of duplex connections for the respective optical switch configured to support bidirectional connectivity between the auxiliary optical switch and the respective optical switch. In at least some example embodiments, the set of optical switches is disposed as a middle stage in an optical Clos network that includes the middle stage and at least one of an ingress stage or an egress stage. In at least some example embodiments, the means for switching of optical communications includes at least one of a set of ingress optical switches configured to be connected to the set of optical input ports of the optical switches or a set of egress optical switches configured to be connected to the set of optical output ports of the optical switches.

In at least some example embodiments, an optical switching stage includes a set of optical input ports, a set of optical output ports, and two or more optical switches, wherein each respective optical switch of the two or more optical switches includes a set of optical input ports, a set of optical output ports, one or more additional optical input ports, and one or more additional optical output ports, wherein the set of optical input ports of the respective optical switch is a subset of, or is optically connected to, the set of optical input ports of the optical switching stage, wherein the set of optical output ports of the respective optical switch is a subset of, or is optically connected to, the set of optical output ports of the optical switching stage, and wherein each of the additional optical output ports of the respective optical switch is optically connected, or optically connectable, to one of the additional optical input ports of one of the other optical switches of the two or more optical switches. In at least some example embodiments, each respective optical switch of the two or more optical switches is optically connected, or optically connectable, to every other optical switch of the two or more optical switches via one of the one or more additional optical output ports of the respective optical switch and one of the one or more additional optical input ports of the other optical switch. In at least some example embodiments, the optical switching stage further includes an auxiliary optical switch, wherein each of the one or more additional optical output ports of each respective optical switch of the two or more optical switches is optically connectable, via the auxiliary optical switch, to any one of the one or more additional optical input ports of any one of the other optical switches of the two or more optical switches. In at least some example embodiments, each respective optical switch of the two or more optical switches is optically connected to every other optical switch of the two or more optical switches via one of the one or more additional optical output ports of the respective optical switch and one of the one or more additional optical input ports of the other optical switch. In at least some example embodiments, the two or more optical switches are S optical switches, numbered 1 to S, wherein S≥3, and wherein for every J from 1 to S: a first additional optical output port of the one or more additional optical output ports of optical switch J is optically connected to a first additional optical input port of the one or more additional optical input ports of optical switch J+1, where J+1 is defined as 1 when J equals S. In at least some example embodiments, for every J from 1 to S: a second additional optical output port of the one or more additional optical output ports of optical switch J is optically connected to a second additional optical input port of the one or more additional optical input ports of optical switch J−1, where J−1 is defined as S when J equals 1. In at least some example embodiments, for every J from 1 to S: optical switch J is not optically connected to any one of the S optical switches other than optical switches J+1 and J−1. In at least some example embodiments, at least one of the optical input ports, or at least one of the optical output ports, of at least one of the two or more optical switches is optically connected to a near end of an optical fiber or to a near end of an optical fiber core. In at least some example embodiments, at least one of the optical input ports of at least one of the two or more optical switches is optically connected to an optical ingress switch, or at least one of the optical output ports of at least one of the two or more optical switches is optically connected to an optical egress switch. In at least some example embodiments, the optical switching stage is disposed as a middle stage in an optical Clos network that includes the middle stage and at least one of an ingress stage or an egress stage. In at least some example embodiments, the two or more optical switches are configured to communicate with a controller configured to control optical switching operations of the optical switching stage. In at least some example embodiments, the controller is configured to route an optical signal arriving at a first optical switch of the two or more optical switches to a second optical switch of the two or more optical switches via one of the one or more additional output ports of the first optical switch and one of the one or more additional input ports of the second switch when the first optical switch is blocked.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate substantially similar or identical elements that are common among the various figures.

DETAILED DESCRIPTION

Figure 1:
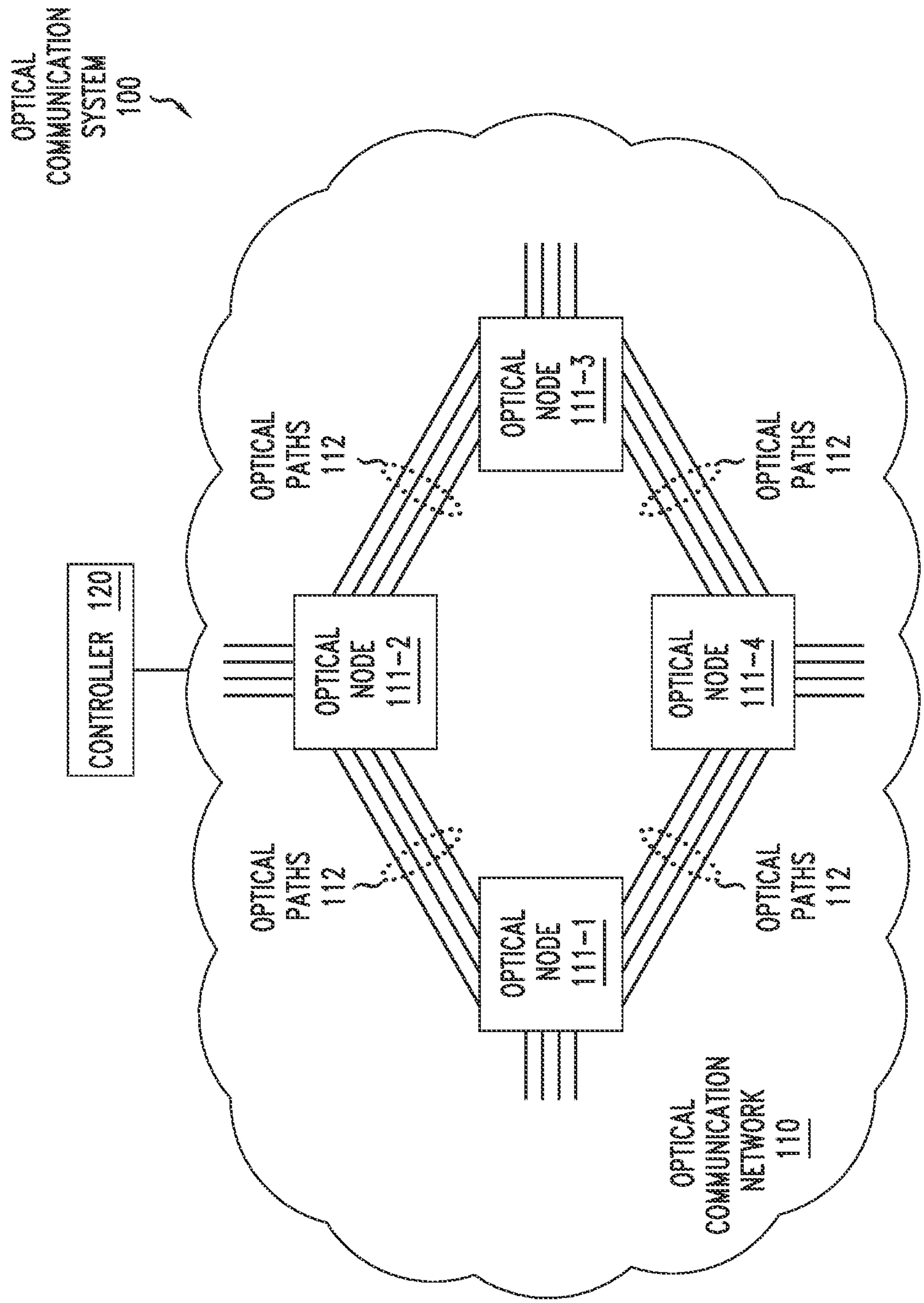
FIG. 1 depicts an example embodiment of an optical communication system including optical nodes which may be configured with optical cross-connect architectures configured to support switching of optical communications between optical fibers and/or cores of optical fibers.

Various example embodiments for supporting optical transport systems are presented. Various example embodiments for supporting optical transport systems may be configured to support optical transport systems that support multiple optical fibers and/or cores of optical fibers based on use of spatial division multiplexing (SDM) techniques. Various example embodiments for supporting optical transport systems that support multiple optical fibers and/or cores of optical fibers based on use of SDM techniques may be configured to support optical transport systems that employ optical nodes configured to support improved connectivity between optical fibers and/or cores of optical fibers connected to the optical nodes and, thus, configured to support improved switching of optical communications between optical fibers and/or cores of optical fibers connected to the optical nodes. Various example embodiments of optical nodes configured to support improved connectivity between optical fibers and/or cores of optical fibers connected to the optical nodes may be configured to support use of various optical cross-connect architectures within the optical nodes in order to provide improved connectivity within the optical nodes in a manner that supports improved connectivity between optical fibers and/or cores of optical fibers connected to the optical nodes. Various example embodiments of optical nodes configured to support use of various optical cross-connect architectures within the optical nodes in order to provide improved connectivity within the optical nodes in a manner that supports improved connectivity between optical fibers and/or cores of optical fibers connected to the optical nodes may be configured to support optical cross-connect architectures that increase connectivity between middle stage switches of the optical nodes (e.g., use of an auxiliary optical switch to increase connectivity between middle stage switches, use of connections between middle stage switches to increase connectivity between middle stage switches, or the like, as well as various combinations thereof). It will be appreciated that such example embodiments of optical nodes configured to use various optical cross-connect architectures to provide improved connectivity between optical fibers and/or cores of optical fibers connected to the optical nodes may be configured to support increased capacity of the optical nodes while providing reduced connection blocking probabilities at the optical nodes, thereby providing a scalable and cost-effective solution for capacity growth in optical systems with reduced connection blocking probabilities even as such optical systems approach the Shannon capacity limit of various communication bands (e.g., the C band and the L band). It will be appreciated that these example embodiments and advantages or potential advantages of such example embodiments, as well as various other example embodiments and advantages or potential advantages of such example embodiments, may be further understood by first considering an optical communication system as depicted in FIG. 1.

Various example embodiments presented herein may be provided in various types of optical communication systems.

FIG. 1 depicts an example embodiment of an optical communication system including optical nodes which may be configured with optical cross-connect architectures configured to support switching of optical communications between optical fibers and/or cores of optical fibers.

The optical communication system 100 includes an optical communication network 110 and a controller 120. The optical communication network 110 is configured to support optical communications. The optical communication network 110 includes four optical nodes 111-1 to 111-4 (collectively, optical nodes) interconnected by optical paths 112. It will be appreciated that the optical nodes 111 and the optical paths 112 may be implemented in various ways. For example, one or more of the optical nodes 111 may include optical add-drop multiplexers configured to optically switch optical communications between near ends of optical fibers or optical cores that make up the optical paths 112. For example, the optical paths 112 may include single-mode optical fibers, cores of multi-core optical fibers, or the like, as well as various combinations thereof. It will be appreciated that, although primarily presented with respect to specific numbers and arrangements of optical nodes 111 and optical paths 112, the optical communication network 110 may include various other numbers and/or arrangements of optical nodes 111 and/or various other numbers and/or arrangements of optical paths 112. The controller 120 is configured to provide control functions for the optical communication network 110.

The optical nodes 111 may be configured to support various optical cross-connect architectures configured to provide improved connectivity in a manner that supports switching of optical communications between optical fibers and/or cores of optical fibers. For example, the optical nodes 111 may be configured to support various optical cross-connect architectures configured to support improved connectivity within the optical nodes 111 and, thus, improved spatial multiplexing within the optical communication network 110. For example, the optical nodes 111 may be configured to support various optical cross-connect architectures configured to improve the modularity and, thus, scalability, of the optical nodes 111 (e.g., various optical node architectures presented herein enable building of large port count optical switches from smaller size optical switched). For example, the optical nodes 111 may be configured to support various optical cross-connect architectures configured to support reduced connection blocking probabilities within the optical nodes 111 and, thus, improved spatial multiplexing within the optical communication network 110.

The optical nodes 111 may be configured to support various optical cross-connect architectures which may be based on Clos node architectures or Clos-type node architectures. The Clos node architectures or Clos-type node architectures may be based on two or more stages of optical switches, such as a two-stage optical switch (e.g., including a set of ingress switches and a set of middle stage switches without egress switches or a set of middle stage switches and a set of egress switches without ingress switches), a three-stage optical switch (e.g., including a set of ingress switches, a set of middle stage switches, and a set of egress switches), or the like. It will be appreciated that such optical cross-connect architectures may be described and evaluated based on various parameters related to spatial multiplexing in optical communication networks. For example, such optical cross-connect architectures may be described and evaluated based on a parameter indicative of a number of fibers per direction (denoted using m), a parameter indicative of a number of middle stage switches (denoted using S), a parameter indicative of a number of directions (denoted using D), a parameter indicative of a interconnection ratio (IR) which is a unit that represents the middle stage switch connection capacity as compared to the input switch to middle stage switch link capacity (m/S, for instance), or the like, as well as various combinations thereof.

The optical nodes 111, as indicated above, may be configured to support various optical cross-connect architectures configured to provide improved connectivity in a manner that supports switching of optical communications between optical fibers and/or cores of optical fibers. For example, the optical nodes 111 may be configured to support optical cross-connect architectures such as a Clos node architectures or Clos-type node architectures. For example, the optical nodes 111 may be configured to support optical cross-connect architectures such as a distributed Clos node architecture (an example embodiment of which is presented with respect to FIG. 2), a Clos node architecture that includes a set of egress switches for reducing blocking probability (an example embodiment of which is presented with respect to FIG. 3), a Clos node architecture that includes indirect interconnections between middle stage switches based on an auxiliary optical switch (an example embodiment of which is presented with respect to FIG. 4), a Clos node architecture that includes direct interconnections between middle stage switches based on a mesh topology (an example embodiment of which is presented with respect to FIG. 5), a Clos node architecture that includes direct interconnections between middle stage switches based on a ring topology (an example embodiment of which is presented with respect to FIG. 8), or the like, as well as various combinations thereof.

It will be appreciated that various example embodiments presented herein may be provided in various other types of optical communication systems.

Figure 2:
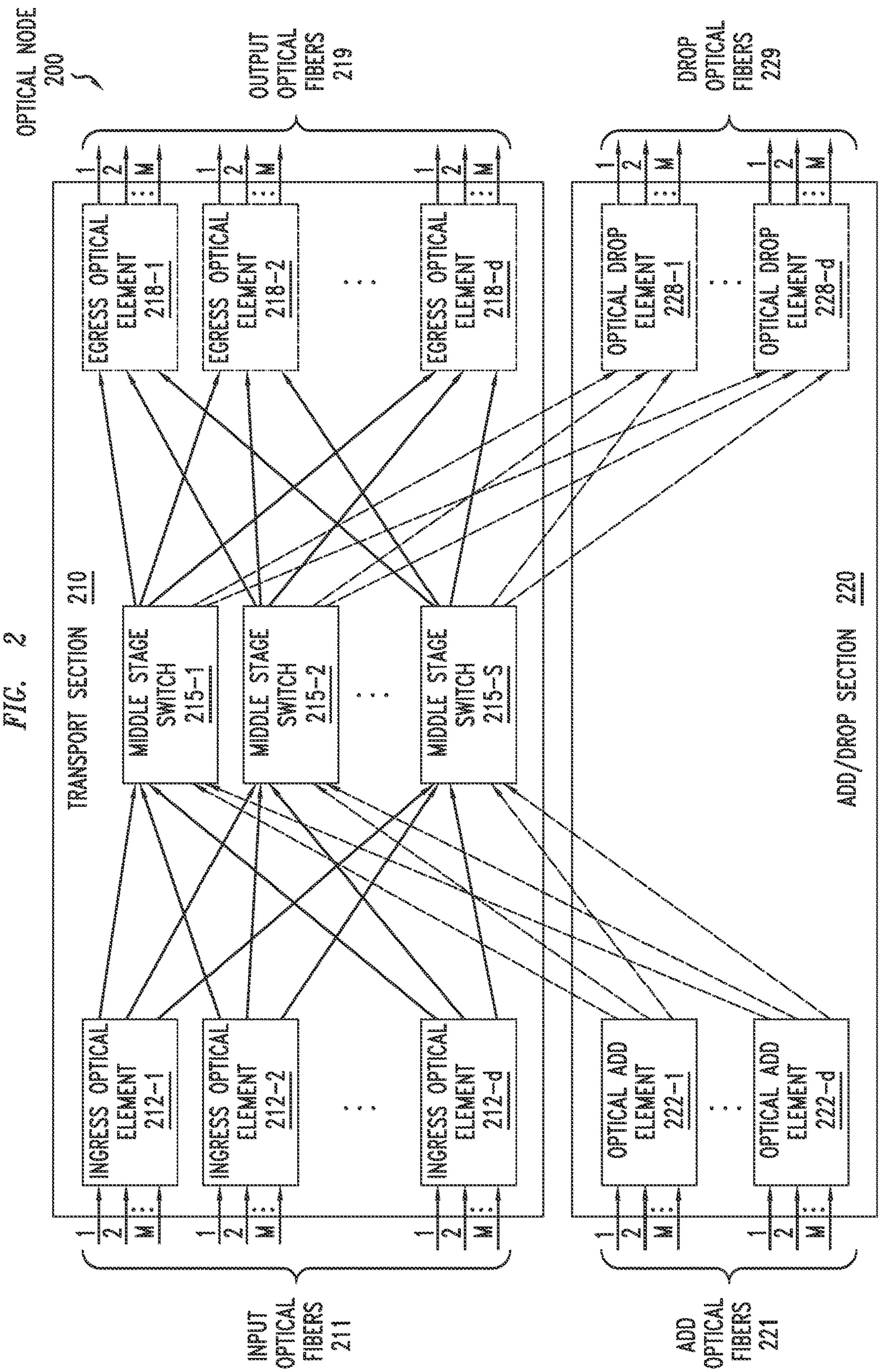
FIG. 2 depicts an example embodiment of an optical node configured with an optical cross-connect architecture, including a two-stage Clos node architecture, which is configured to support switching of optical communications between optical fibers and/or cores of optical fibers.

FIG. 2 depicts an example embodiment of an optical node configured with an optical cross-connect architecture, including a two-stage Clos node architecture, which is configured to support switching of optical communications between optical fibers and/or cores of optical fibers. It is noted that the architecture of FIG. 2 may be referred to herein as Architecture A (Arch A) for purposes of illustrating comparisons of various aspects of different optical node architectures (e.g., as presented with respect to FIGS. 6A-6C and FIG. 7A).

As depicted in FIG. 2, optical node 200 includes a transport section 210 and an add/drop section 220. The transport section 210 is configured to support pass-through of optical signals between upstream and downstream optical nodes which are omitted for purposes of clarity. The add/drop section 220 is configured to support adding of optical signals locally at the optical node 200 via the transport section 210 for propagation of the optical signals toward downstream optical nodes (omitted for purposes of clarity) and to support dropping of optical signals locally at the optical node 200 via the transport section 210 for reception of the optical signals from upstream optical nodes (omitted for purposes of clarity).

The transport section 210 includes an ingress stage, an egress stage, and a middle stage disposed between the ingress stage and the egress stage. The ingress stage includes a set of ingress optical elements 212-1 to **212-*d* (collectively, ingress optical elements 212) supporting a set of input optical fibers 211. The egress stage includes a set of egress optical elements 218-1 to 218-*d* (collectively, egress optical elements 218) supporting a set of output optical fibers 219. The middle stage includes a set of middle stage switches 215-1 to 215-*s* (collectively, middle stage switches 215) disposed between the ingress optical elements 212 and the egress optical elements 218 for switching optical signals between the ingress optical elements 212 and the egress optical elements 218 and, thus, between the input optical fibers 211 and the output optical fibers 219**.

The add/drop section 220 includes an add section and a drop section, each of which is connected to the transport section 210. The add section includes a set of optical add elements 222-1 to **222-*d* (collectively, optical add elements 222) supporting a set of add optical fibers 221 and configured to locally add optical signals via the middle stage switches 215 for adding optical signals for transmission via the output optical fibers 219 of the transport section 210. The drop section includes a set of optical drop elements 228-1 to 228-*d* (collectively, optical drop elements 228) supporting a set of drop optical fibers 229 and configured to locally drop optical signals via the middle stage switches 215 for dropping optical signals received via the input optical fibers 211 of the transport section 210**.

The ingress optical elements 212 each support a set of m of the input optical fibers 211 for receiving optical signals at the optical node 200 from other optical nodes, and are each connected to each of the middle stage switches 215 via at least one optical connection. The ingress optical elements 212 are configured to direct optical signals from the input optical fibers 211 to the middle stage switches 215 for pass through of optical signals to the egress optical elements 218-1 to **218-*d* and for dropping of optical signals via the optical drop elements 228 of the add/drop section 220. The ingress optical elements 212 may be implemented as optical switches configured to support switching of optical signals between the input optical fibers 211 and the optical connections from the ingress optical elements 212 to the middle stage switches 215. It will be appreciated that, although primarily presented with respect to example embodiments in which each of the ingress optical elements 212 includes exactly m input optical fibers, in at least some example embodiments one or more of the ingress optical elements 212 may include other numbers of input optical fibers. It will be appreciated that, although primarily presented with respect to example embodiments in which each of the ingress optical elements 212 includes a single connection to each of the middle stage switches 215, in at least some example embodiments one or more of the ingress optical elements 212 may include other numbers of connections to the middle stage switches 215**.

The egress optical elements 218 each support a set of m of the output optical fibers 219 for sending optical signals from the optical node 200 toward other optical nodes, and are each connected to each of the middle stage switches 215 via at least one optical connection. The egress optical elements 218 are configured to direct optical signals from the middle stage switches 215 to the output optical fibers for pass through of optical signals from the ingress optical elements 212-1 to **212-*d* and for adding of optical signals via the optical add elements 222 of the add/drop section 210. The egress optical elements 218 are not implemented as optical switches. It will be appreciated that, although primarily presented with respect to example embodiments in which each of the egress optical elements 218 includes a single connection to each of the middle stage switches 215, in at least some example embodiments one or more of the egress optical elements 218 may include other numbers of connections to the middle stage switches 215. It will be appreciated that, although primarily presented with respect to example embodiments in which each of the egress optical elements 218 includes exactly m output optical fibers, in at least some example embodiments one or more of the egress optical elements 218** may include other numbers of output optical fibers.

The optical add elements 222 are configured to add optical signals locally at the optical node 200. The optical add elements 222 each support a set of m of the add optical fibers 221 for adding optical signals at the optical node 200 (e.g., optical signals being introduced to the optical network at the optical node 200), and are each connected to each of the middle stage switches 215 via at least one optical connection. The optical add elements 222 may be implemented as optical multiplexers. It will be appreciated that, although primarily presented with respect to example embodiments in which each of the optical add elements 222 includes exactly m add optical fibers, in at least some example embodiments one or more of the optical add elements 222 may include other numbers of add optical fibers. It will be appreciated that, although primarily presented with respect to example embodiments in which each of the optical add elements 222 includes a single connection to each of the middle stage switches 215, in at least some example embodiments one or more of the optical add elements 222 may include other numbers of connections to the middle stage switches 215.

The optical drop elements 228 are configured to drop optical signals locally at the optical node 200. The optical drop elements 228 each support a set of m of the drop optical fibers 229 for dropping optical signals at the optical node 200 (e.g., optical signals being removed from the optical network at the optical node 200), and are each connected to each of the middle stage switches 215 via at least one optical connection. The optical drop elements 228 may be implemented as optical demultiplexers. It will be appreciated that, although primarily presented with respect to example embodiments in which each of the optical drop elements 228 includes a single connection to each of the middle stage switches 215, in at least some example embodiments one or more of the optical drop elements 228 may include other numbers of connections to the middle stage switches 215. It will be appreciated that, although primarily presented with respect to example embodiments in which each of the optical drop elements 228 includes exactly m drop optical fibers, in at least some example embodiments one or more of the optical drop elements 228 may include other numbers of drop optical fibers.

The middle stage switches 215 are configured to support switching of optical signals between various elements within the optical node 200. As indicated above, each of the middle stage switches 215 is connected to each of the ingress optical elements 212 (for switching optical signals, received over the input optical fibers 211, toward the egress optical elements 218 for propagation over the output optical fibers 219 and toward the optical drop elements 228 for optical signals being dropped locally) via respective optical connections (e.g., optical fibers) from respective output ports of the ingress optical elements 212 to respective input ports of the middle stage switches 215. As indicated above, each of the middle stage switches 215 is connected to each of the egress optical elements 218 (for switching, toward the egress optical elements 218 for propagation over the output optical fibers 219, optical signals received over the input optical fibers 211 and optical signals received from the optical add elements 222 for optical signals being added locally) via respective optical connections (e.g., optical fibers) from respective output ports of the middle stage switches 215 to respective input ports of the egress optical elements 218. As indicated above, each of the middle stage switches 215 is connected to each of the optical add elements 222 (for switching optical signals being added at the optical node 200 from the optical add elements 222 toward the output optical fibers 219) via respective optical connections (e.g., optical fibers) from respective output ports of the optical add elements 222 to respective input ports of the middle stage switches 215 and is connected to each of the optical drop elements 228 (for switching optical signals being dropped at the optical node 200 from the input optical fibers 211 toward the optical drop elements 228) via respective optical connections (e.g., optical fibers) from respective output ports of the middle stage switches 215 to respective input ports of the optical drop elements 228. In other words, as illustrated in FIG. 2, each of the middle stage switches 215 includes a set of input ports configured to receive optical signals (and, thus, which also may be referred to herein as optical input ports) and a set of output ports configured to send optical signals (and, thus, which also may be referred to herein as optical output ports).

It will be appreciated that, although primarily presented with respect to use of specific types, numbers, and arrangements of elements, the optical node 200 of FIG. 2 may include various other types, numbers, and/or arrangements of elements. It will be appreciated that the types, numbers, and/or arrangements of elements (e.g., input elements, MS switches, output elements, or the like, as well as various combinations thereof) of the optical node 200 may vary for the optical node 200 in various ways. For example, the types, numbers, and/or arrangements of elements of the optical node 200 may vary for a particular instance of the optical node 200, e.g., in terms of the manner in which the optical node 200 is configured (e.g., different input and output elements may have different sizes, may be connected in various ways, or the like), in terms of evolution of the optical node 200 over the lifetime of the optical node 200 (e.g., including elements of certain types/sizes and connecting them at the time of commissioning, including elements of certain types/sizes and not connecting them at the time of commissioning but permitting connecting of the elements at a later time as capacity needs change, replacing existing elements with elements of different types/sizes and/or introducing new elements of various types/sizes after commissioning to enable scaling with capacity changes, or the like), or the like, as well as various combinations thereof. For example, the types, numbers, and/or arrangements of elements of the optical node 200 may vary for a different instances of the optical node 200 deployed within a communication network. It will be appreciated that that the types, numbers, and/or arrangements of elements of the optical node 200 may vary for the optical node 200 in various other ways.

Figure 3:
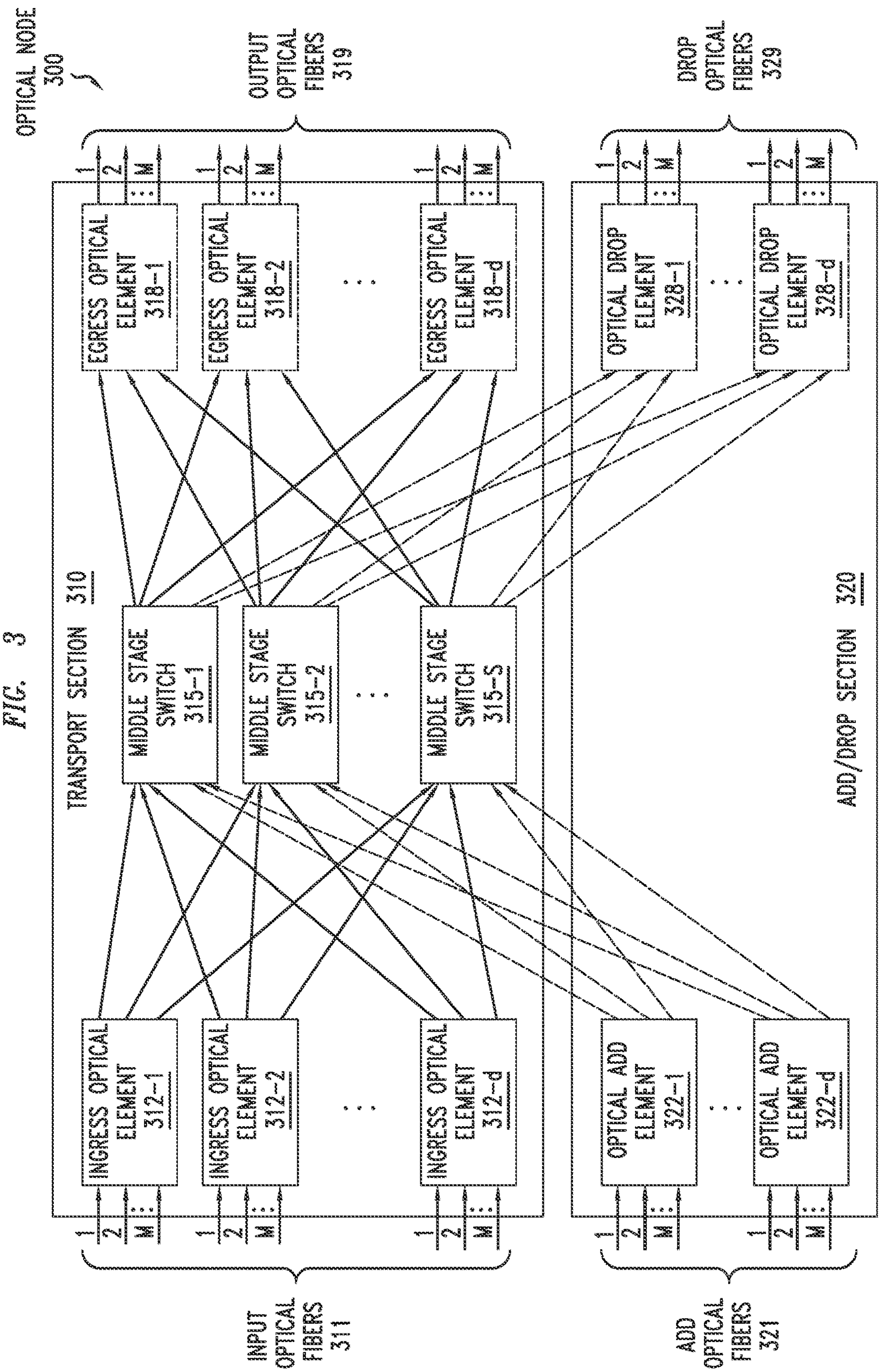
FIG. 3 depicts an example embodiment of an optical node configured with an optical cross-connect architecture, including a three-stage Clos node architecture that includes a set of egress switches for reducing blocking probability, which is configured to support switching of optical communications between optical fibers and/or cores of optical fibers.

FIG. 3 depicts an example embodiment of an optical node configured with an optical cross-connect architecture, including a three-stage Clos node architecture that includes a set of egress switches for reducing blocking probability, which is configured to support switching of optical communications between optical fibers and/or cores of optical fibers. It is noted that the architecture of FIG. 3 may be referred to herein as Architecture B (Arch B) for purposes of illustrating comparisons of various aspects of different optical node architectures (e.g., as presented with respect to FIGS. 6A-6C).

As depicted in FIG. 3, optical node 300 is similar to the optical node 200 of FIG. 2, with the exception that the egress stage of the transport section uses optical switches. In the transport section 310, the optical node 300 includes a set of ingress optical elements 312-1 to 312-*d* (collectively, ingress optical elements 312) supporting a set of input optical fibers 311, a set of egress optical elements 318-1 to 318-*d* (collectively, egress optical elements 318) supporting a set of output optical fibers 319, and a set of middle stage switches 315-1 to 315-*s* (collectively, middle stage switches 315) disposed between the ingress optical elements 312 and the egress optical elements 318 for switching optical signals between the input optical fibers 311 and the output optical fibers 319 and also connected to the add/drop section 320 for supporting adding/dropping of optical signals at the optical node 300. In the add/drop section 320, the optical node 300 includes a set of optical add elements 322-1 to 322-*d* (collectively, optical add elements 322) associated with add optical fibers 321 and configured to locally add optical signals via the middle stage switches 315 for adding optical signals for transmission via the output optical fibers 319 and also includes a set of optical drop elements 328-1 to **328-*d* (collectively, optical drop elements 328) configured to locally drop optical signals via the middle stage switches 315 for dropping optical signals received via the input optical fibers 311**.

In the optical node 300, unlike the egress optical elements 218 of FIG. 2 in which the egress optical elements 218 are simple pass-through elements that connect output ports of the middle stage switches 215 to the output optical fibers 219, the egress optical elements 318 of FIG. 3 are implemented as optical switches that provide increased flexibility in connecting output ports of the middle stage switches 315 to the output optical fibers 319 (and, thus, increased flexibility in connecting various input optical fibers 311 to various output optical fibers 319). Thus, it will be appreciated that the use of optical switches as the egress optical elements 318 in the output stage reduces the blocking probability, but at the expense of the additional ports of the optical switches (and, thus, at an increased cost).

Figure 4:
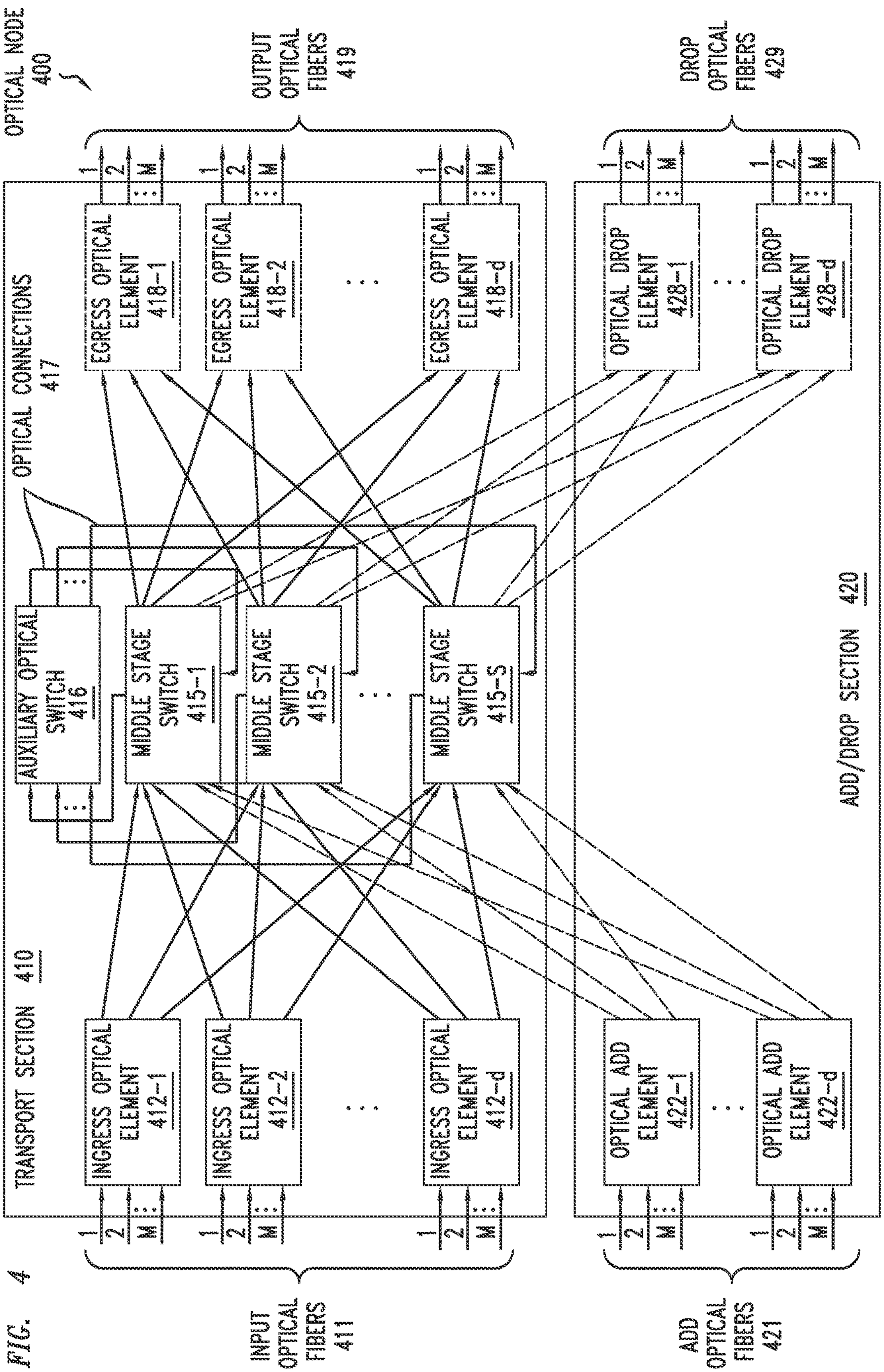
FIG. 4 depicts an example embodiment of an optical node configured with an optical cross-connect architecture, including a Clos node architecture that includes indirect interconnections between middle stage switches based on an auxiliary optical switch, which is configured to support switching of optical communications between optical fibers and/or cores of optical fibers.

FIG. 4 depicts an example embodiment of an optical node configured with an optical cross-connect architecture, including a Clos node architecture that includes indirect interconnections between middle stage switches based on an auxiliary optical switch, which is configured to support switching of optical communications between optical fibers and/or cores of optical fibers. It is noted that the architecture of FIG. 4 may be referred to herein as Architecture C (Arch C) for purposes of illustrating comparisons of various aspects of different optical node architectures (e.g., as presented with respect to FIGS. 6A-6C and FIG. 7).

As depicted in FIG. 4, optical node 400 is similar to the optical node 200 of FIG. 2, with the exception that the middle stage is augmented to support increased connectivity between the middle stage switches. In the transport section 410, the optical node 400 includes a set of ingress optical elements 412-1 to **412-*d* (collectively, ingress optical elements 412) supporting a set of input optical fibers 411, a set of egress optical elements 418-1 to 418-*d* (collectively, egress optical elements 418) supporting a set of output optical fibers 419, and a set of middle stage switches 415-1 to 415-*s* (collectively, middle stage switches 415) disposed between the ingress optical elements 412 and the egress optical elements 418 for switching optical signals between the input optical fibers 411 and the output optical fibers 419 and also connected to the add/drop section 420 for supporting adding/dropping of optical signals at the optical node 400. In the add/drop section 420, the optical node 400 includes a set of optical add elements 422-1 to 422-*d* (collectively, optical add elements 422) associated with add optical fibers 421 and configured to locally add optical signals via the middle stage switches 415 for adding optical signals for transmission via the output optical fibers 419 and also includes a set of optical drop elements 428-1 to 428-*d* (collectively, optical drop elements 428) configured to locally drop optical signals via the middle stage switches 415 for dropping optical signals received via the input optical fibers 411**.

As depicted in FIG. 4, the middle stage is augmented to support increased connectivity between the middle stage switches 415 based on use of an optical switch referred to herein as auxiliary optical switch 416. The auxiliary optical switch 416 is configured to provide indirect connections between the middle stage switches 415. The middle stage is configured such that there is full duplex connectivity between each of the middle stage switches 415 and the auxiliary optical switch 416 via a set of optical connections 417 (illustratively, a set of optical connections 417 from each of the middle stage switches 415 to the auxiliary optical switch 416 for propagation of optical signals from the middle stage switches 415 to the auxiliary optical switch 416 and a set of optical connections 417 from the auxiliary optical switch 416 to each of the middle stage switches 415 for propagation of optical signals from the auxiliary optical switch 416 to the middle stage switches 415). It is noted that, in this configuration, each of the middle stage switches 415 includes only one additional optical output port (to the auxiliary optical switch 416) and only one additional optical input port (from the auxiliary optical switch 416). The auxiliary optical switch 416 is controllable so as to re-route an optical signal arriving at one of the middle stage switches 415 to another one of the middle stage switches 415. As illustrated in FIG. 4, in the middle stage, each of the middle stage switches 415 includes a set of input ports and a set of output ports, which can be interconnected via a set of optical interconnection ports on the middle stage switch 415 that connect the middle stage switch 415 to the auxiliary optical switch 416. In this architecture, optical signals traversing the middle stage can be switched from any middle stage switch 415 to any other middle stage switch 415, thereby enabling optical signals to be switched from any input optical fiber 411 to any output optical fiber 419, from any input optical fiber 411 to any drop optical fiber 429 on any optical drop element 428, and from any add optical fiber 421 on any optical add element 422 to any output optical fiber 419. The use of the auxiliary optical switch 416 to provide indirect connections between the middle stage switches 415 reduces the blocking probability of the optical node 400. In the shown example, the input ports of the middle stage switches 415 are connected to input optical fibers 411 via the ingress optical elements 412 and connected to the add optical fibers 421 via the optical add elements 422; similarly, the output ports of the middle stage switches 415 are connected to output optical fibers 419 via the egress optical elements 418 and connected to the drop optical fibers 429 via the optical drop elements 428.

In the optical node 400, like the egress optical elements 218 of FIG. 2 which are simple pass-through elements that connect the output ports of the middle stage switches 215 to the output optical fibers and unlike the egress optical elements 318 of FIG. 3 which are implemented as optical switches, the egress optical elements 418 of FIG. 4 are simple pass-through elements that connect the output ports of the middle stage switches 415 to the output optical fibers 419 and the auxiliary optical switch 416 provides increased flexibility in connecting the output ports of the middle stage switches 415 to the output optical fibers 419 (and, thus, increased flexibility in connecting various input optical fibers 411 to various output optical fibers 419) without requiring the use of optical switches as the egress optical elements 418. It is noted that, in the optical node 400, each IR unit increase represents IR*(m/s) fibers added to each middle stage switch 415. Thus, it will be appreciated that the use of the auxiliary optical switch 416 in the middle stage to provide improved connectivity between the input optical fibers 411 and the output optical fibers 419 reduces the blocking probability without incurring the expense of using optical switches as the egress optical elements as in the optical node 300 of FIG. 3.

Figure 5:
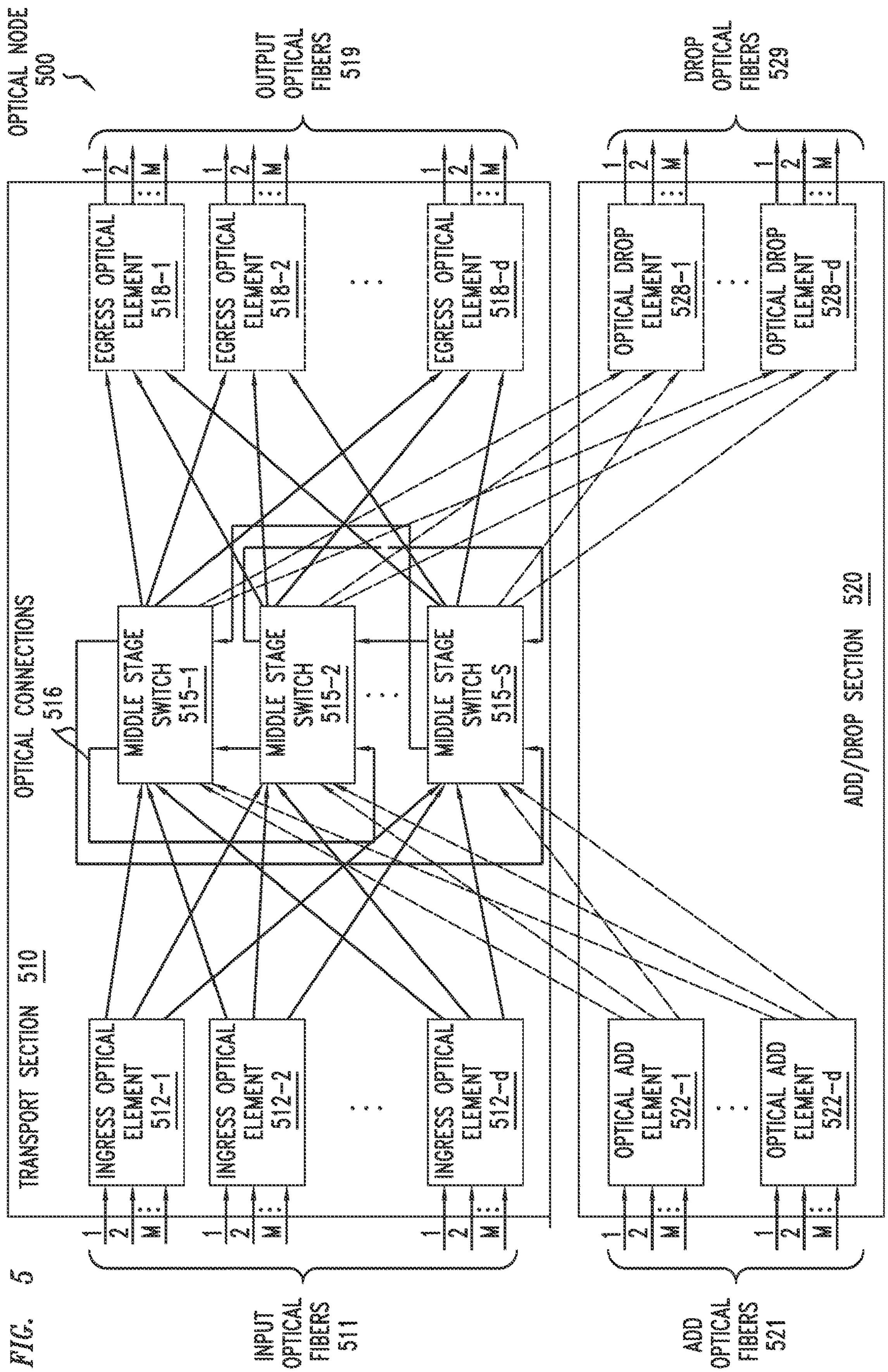
FIG. 5 depicts an example embodiment of an optical node configured with an optical cross-connect architecture, including a Clos node architecture that includes direct interconnections between middle stage switches based on a mesh topology, which is configured to support switching of optical communications between optical fibers and/or cores of optical fibers.

FIG. 5 depicts an example embodiment of an optical node configured with an optical cross-connect architecture, including a Clos node architecture that includes direct interconnections between middle stage switches based on a mesh topology, which is configured to support switching of optical communications between optical fibers and/or cores of optical fibers. It is noted that the architecture of FIG. 2 may be referred to herein as Architecture D (Arch D) for purposes of illustrating comparisons of various aspects of different optical node architectures (e.g., as presented with respect to FIGS. 6A-6C and FIG. 7B).

As depicted in FIG. 5, optical node 500 is similar to the optical node 200 of FIG. 2, with the exception that the middle stage is augmented to support increased connectivity between the middle stage switches. In the transport section 510, the optical node 500 includes a set of ingress optical elements 512-1 to 512-*d* (collectively, ingress optical elements 512) supporting a set of input optical fibers 511, a set of egress optical elements 518-1 to 518-*d* (collectively, egress optical elements 518) supporting a set of output optical fibers 519, and a set of middle stage switches 515-1 to 515-*s* (collectively, middle stage switches 515) disposed between the ingress optical elements 512 and the egress optical elements 518 for switching optical signals between the input optical fibers 511 and the output optical fibers 519 and also connected to the add/drop section 520 for supporting adding/dropping of optical signals at the optical node 500. In the add/drop section 520, the optical node 500 includes a set of optical add elements 522-1 to 522-*d* (collectively, optical add elements 522) associated with add optical fibers 521 and configured to locally add optical signals via the middle stage switches 515 for adding optical signals for transmission via the output optical fibers 519 and also includes a set of optical drop elements 528-1 to 528-*d* (collectively, optical drop elements 528) configured to locally drop optical signals via the middle stage switches 515 for dropping optical signals received via the input optical fibers 511.

As depicted in FIG. 5, the middle stage is augmented to support increased connectivity between the middle stage switches 515 based on use of optical connections 516 between the middle stage switches 515 that provide direct connections between the middle stage switches 515. The middle stage is configured such that there is full duplex connectivity between each of the middle stage switches 515 based on the optical connections 516 (illustratively, a set of optical connections 516 from the middle stage switch 515-1 to each of the other middle stage switches 515 for propagation of optical signals from the middle stage switch 515-1 to each of the other middle stage switches 515, a set of optical connections 516 from the middle stage switch 515-2 to each of the other middle stage switches 515 for propagation of optical signals from the middle stage switch 515-2 to each of the other middle stage switches 515, and so forth), thereby providing a full mesh topology of full duplex optical connectivity between the middle stage switches 515. The middle stage is configured such that there are additional ports on the middle stage switches 515 that provide alternate routes to reach the intended middle stage switch 515 for any given output port. As illustrated in FIG. 5, in the middle stage, each of the middle stage switches 515 includes a set of input ports (connected to input optical fibers 511 via the ingress optical elements 512 and connected to the add optical fibers 521 via the optical add elements 522) and a set of output ports (connected to output optical fibers 519 via the egress optical elements 518 and connected to the drop optical fibers 529 via the optical drop elements 528), which can be interconnected via a set of optical interconnection ports on the middle stage switch 515 that connect the middle stage switch 515 to each of the other middle stage switches 515 in a full mesh topology). In this architecture, optical signals traversing the middle stage can be switched from any middle stage switch 515 to any other middle stage switch 515, thereby enabling optical signals to be switched from any input optical fiber 511 to any output optical fiber 519, from any input optical fiber 511 to any drop optical fiber 529 on any optical drop element 528, and from any add optical fiber 521 on any optical add element 522 to any output optical fiber 519. The use of the optical connections 516 to provide a full mesh topology of full duplex optical connectivity between the middle stage switches 515 reduces the blocking probability of the optical node 500.

In the optical node 500, like the egress optical elements 218 of FIG. 2 which are simple pass-through elements that connect the output ports of the middle stage switches 215 to the output optical fibers 219 and unlike the egress optical elements 318 of FIG. 3 which are implemented as optical switches, the egress optical elements 518 of FIG. 5 are simple pass-through elements that connect the output ports of the middle stage switches 515 to the output optical fibers 519 and the optical connections 516 provide increased flexibility in connecting the output ports of the middle stage switches 515 to the output optical fibers 519 (and, thus, increased flexibility in connecting various input optical fibers 511 to various output optical fibers 519) without requiring the use of optical switches as the egress optical elements 518. It is noted that, in the optical node 500, each IR unit increase represents (S−1)*IR fibers added to each middle stage switch 515, since each middle stage switch 515 needs to interconnect to each (S−1) other middle stage switch 515 to provide the full mesh topology. Thus, it will be appreciated that the use of the optical connections 516 in the middle stage to provide improved connectivity between the input optical fibers 511 and the output optical fibers 519 reduces the blocking probability without incurring the expense of using optical switches as the egress optical elements as in the optical node 300 of FIG. 3.

Figure 6A:
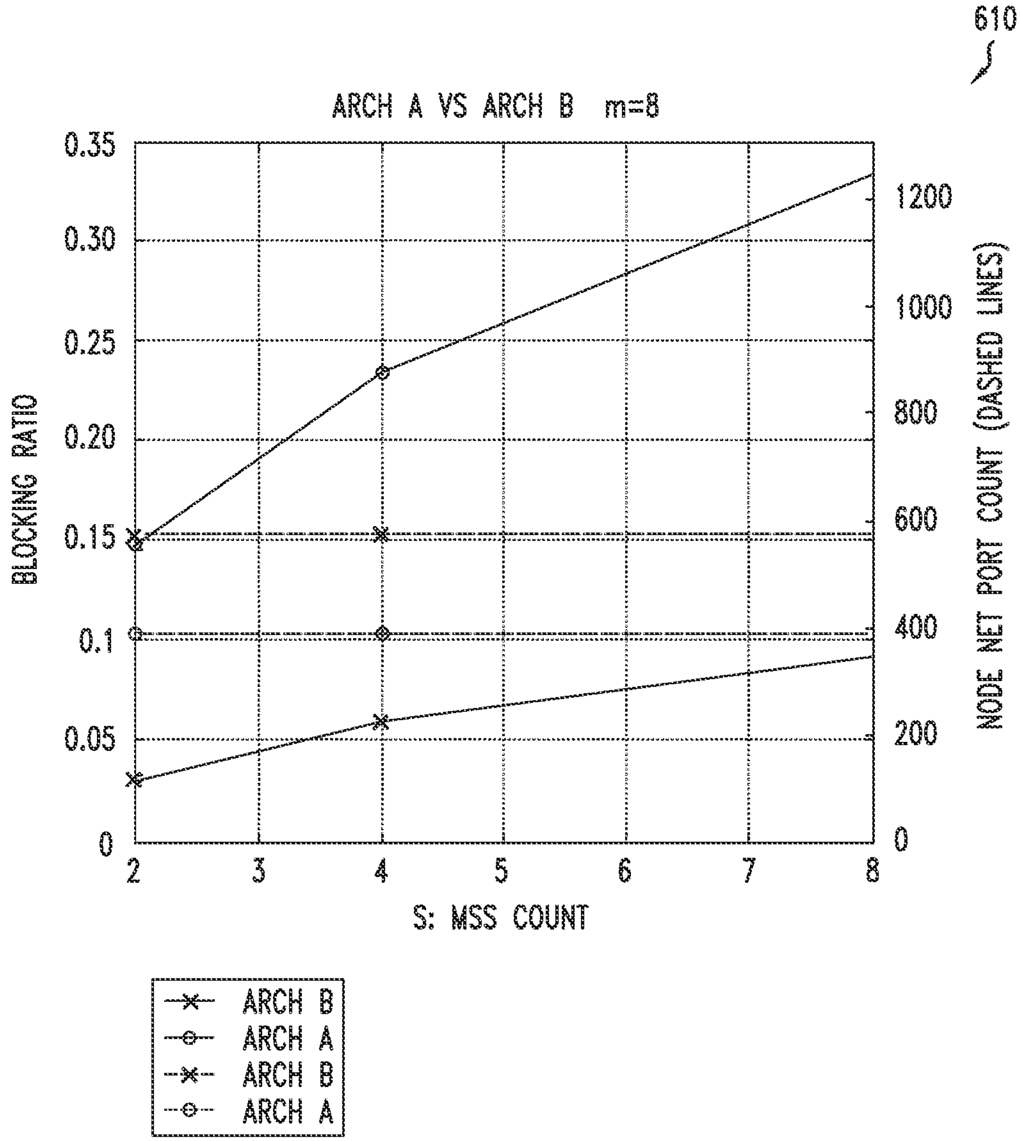
FIGS. 6A-6C depict blocking ratio and port count comparisons for the optical cross-connect architecture of FIG. 2 (denoted as Arch A) as compared against the optical cross-connect architecture of FIG. 3 (denoted as Arch B), the optical cross-connect architecture of FIG. 4 (denoted as Arch C), and the optical cross-connect architecture of FIG. 5 (denoted as Arch D)
Figure 6B:
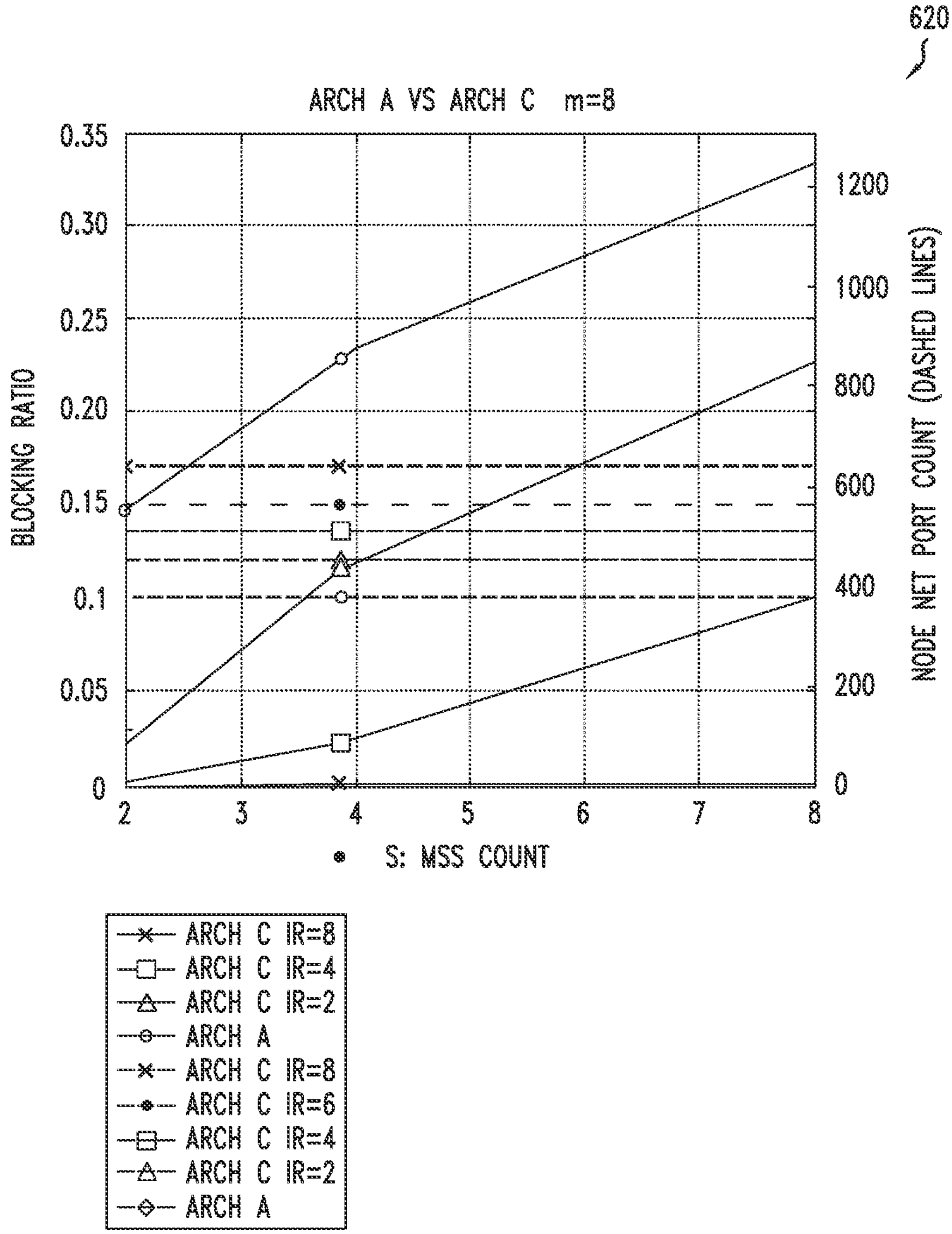
Figure 6C:
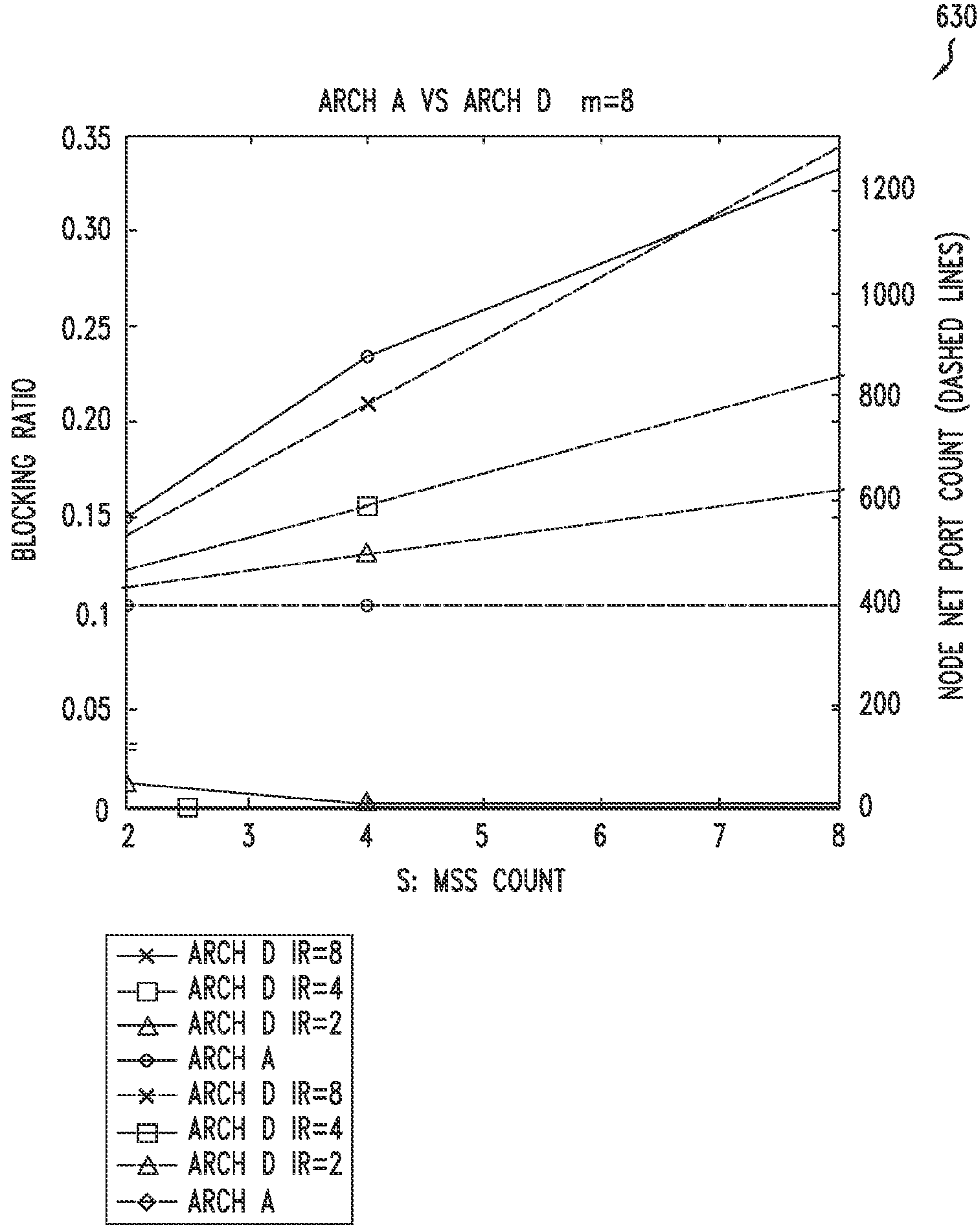

FIGS. 6A-6C depict blocking ratio and port count comparisons for the optical cross-connect architecture of FIG. 2 (denoted as Arch A) as compared against the optical cross-connect architecture of FIG. 3 (denoted as Arch B), the optical cross-connect architecture of FIG. 4 (denoted as Arch C), and the optical cross-connect architecture of FIG. 5 (denoted as Arch D).

FIG. 6A depicts blocking ratio and port count comparisons for the optical cross-connect architecture of FIG. 2 (denoted as Arch A) as compared against the optical cross-connect architecture of FIG. 3 (denoted as Arch B). In FIG. 6A, the graph 610 illustrates changes in the blocking probability of an optical node for Arch A and Arch B when m (the number of fibers per direction) is equal to 8 (i.e., m=8). In the graph 610 of FIG. 6A, the x-axis indicates the MSS count of the optical node, the y-axis for the solid line results indicate how the blocking probability changes with changes in the MSS count, and the y-axis for the dashed lines indicates the net port count of the optical node. As illustrated by the graph 610 of FIG. 6A, the blocking probability of an optical node based on Arch B is significantly less than the blocking probability of an optical node based on Arch A (across all illustrated values of MSS count). As further illustrated by the graph 610 of FIG. 6A, the blocking probability of an optical node based on Arch B increases at a lower rate than the blocking probability of an optical node based on Arch A as MSS count increases.

FIG. 6B depicts blocking ratio and port count comparisons for the optical cross-connect architecture of FIG. 2 (denoted as Arch A) as compared against the optical cross-connect architecture of FIG. 4 (denoted as Arch C). In FIG. 6B, the graph 620 illustrates changes in the blocking probability of an optical node for Arch A and Arch C when m (the number of fibers per direction) is equal to 8 (i.e., m=8), with results being illustrated for multiple different values of the IR for Arch C (illustratively, IR=2, IR=4, IR=6, and IR=8). In the graph 620 of FIG. 6B, the x-axis indicates the MSS count of the optical node, the y-axis for the solid line results indicate how the blocking probability changes with changes in the MSS count, and the y-axis for the dashed lines indicates the net port count of the optical node. As illustrated by the graph 620 of FIG. 6B, the blocking probability of an optical node based on Arch C is significantly less than the blocking probability of an optical node based on Arch A (across all illustrated values of MSS count) as well as for all values of the IR supported by the optical node based on Arch C. As further illustrated by the graph 620 of FIG. 6B, the blocking probability of an optical node based on Arch C significantly decreases for increased values of the IR supported by the optical node based on Arch C.

FIG. 6C depicts blocking ratio and port count comparisons for the optical cross-connect architecture of FIG. 2 (denoted as Arch A) as compared against the optical cross-connect architecture of FIG. 5 (denoted as Arch D). In FIG. 6C, the graph 630 illustrates changes in the blocking probability of an optical node for Arch A and Arch D when m (the number of fibers per direction) is equal to 8 (i.e., m=8), with results being illustrated for multiple different values of the IR for Arch D (illustratively, IR=2, IR=4, and IR=8). In the graph 630 of FIG. 6C, the x-axis indicates the MSS count of the optical node, the y-axis for the solid line results indicate how the blocking probability changes with changes in the MSS count, and the y-axis for the dashed lines indicates the net port count of the optical node. As illustrated by the graph 630 of FIG. 6C, the blocking probability of an optical node based on Arch D is significantly less than the blocking probability of an optical node based on Arch A (across all illustrated values of MSS count), for all values of the IR supported by the optical node based on Arch D. More specifically, the blocking probability of an optical node based on Arch D is nearly zero or zero for all illustrated values of MSS count, for all values of the IR supported by the optical node based on Arch D.

In FIGS. 6A-6C, it may be seen that better performance may be achieved at the node level at a lower cost (net port count) when using Arch C and Arch D, as compared with Arch A and Arch B. For example, FIG. 6A shows the clear reduction (>75%) of blocking ratio when adding optical switchs (Arch B) compared to that of Arch A, in exchange for a 50% increase in overall port count. Additionally, for example, as may be seen from FIG. 6B, half the blocking ratio can be achieved at lower cost (−10% port count), by using Arch C instead of Arch B applying IR=4. Additionally, for example, as may be seen from FIG. 6C, using Arch D, the BR can be reduced to negligible levels (<0.1%) with 16% less ports required (IR=2, for S=4) than Arch B. Nonetheless, the MSS size would increase for Arch C and Arch D with respect to Arch A and Arch B, since more ports are needed to interconnect them and an additional switch (namely, the auxiliary optical switch) is needed for Arch C.

Figure 7A:
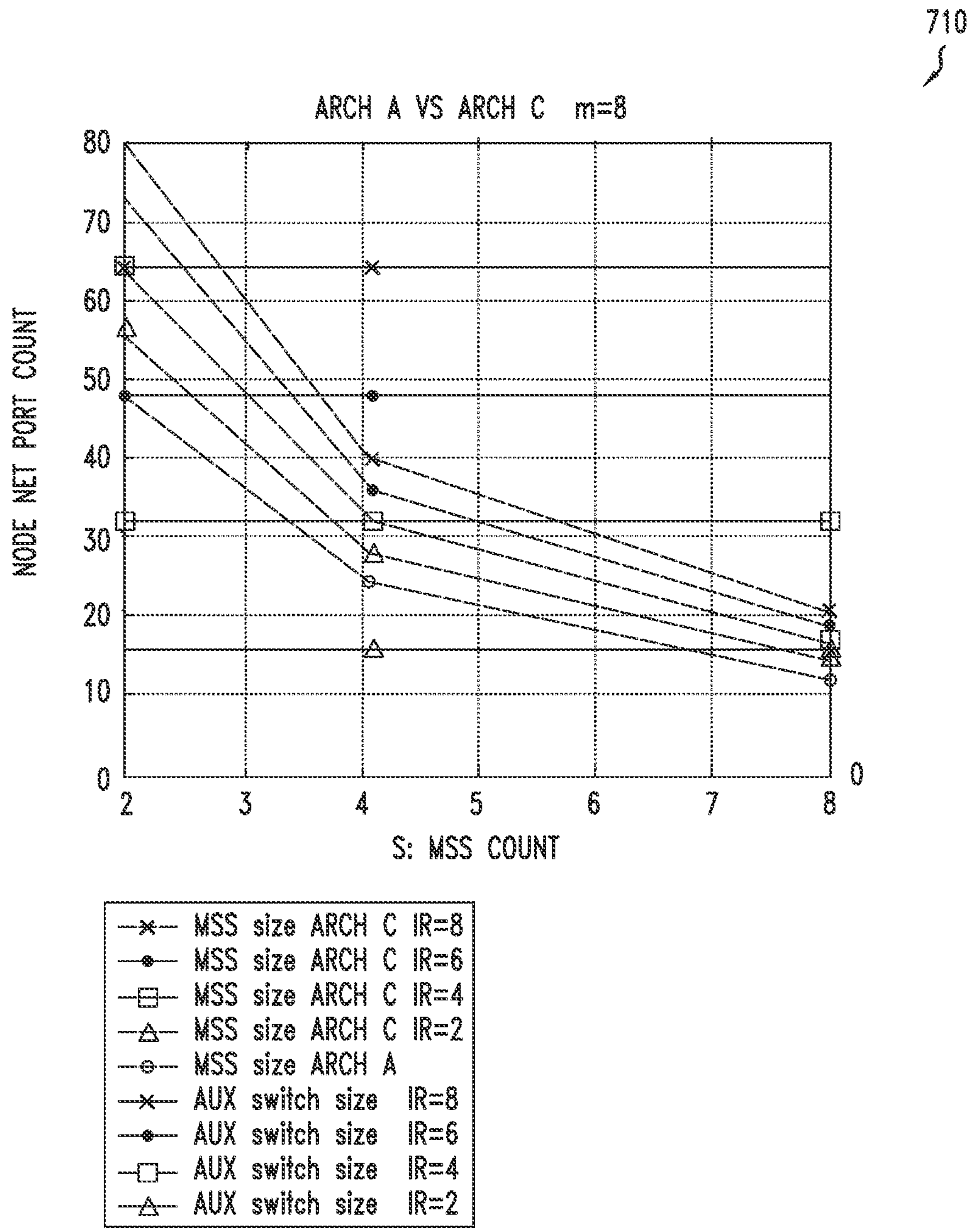
FIGS. 7A-7B depict middle stage switch (MSS) count comparisons for the optical cross-connect architecture of FIG. 2 (denoted as Arch A) as compared again the optical cross-connect architecture of FIG. 4 (denoted as Arch C) and the optical cross-connect architecture of FIG. 5 (denoted as Arch D)
Figure 7B:
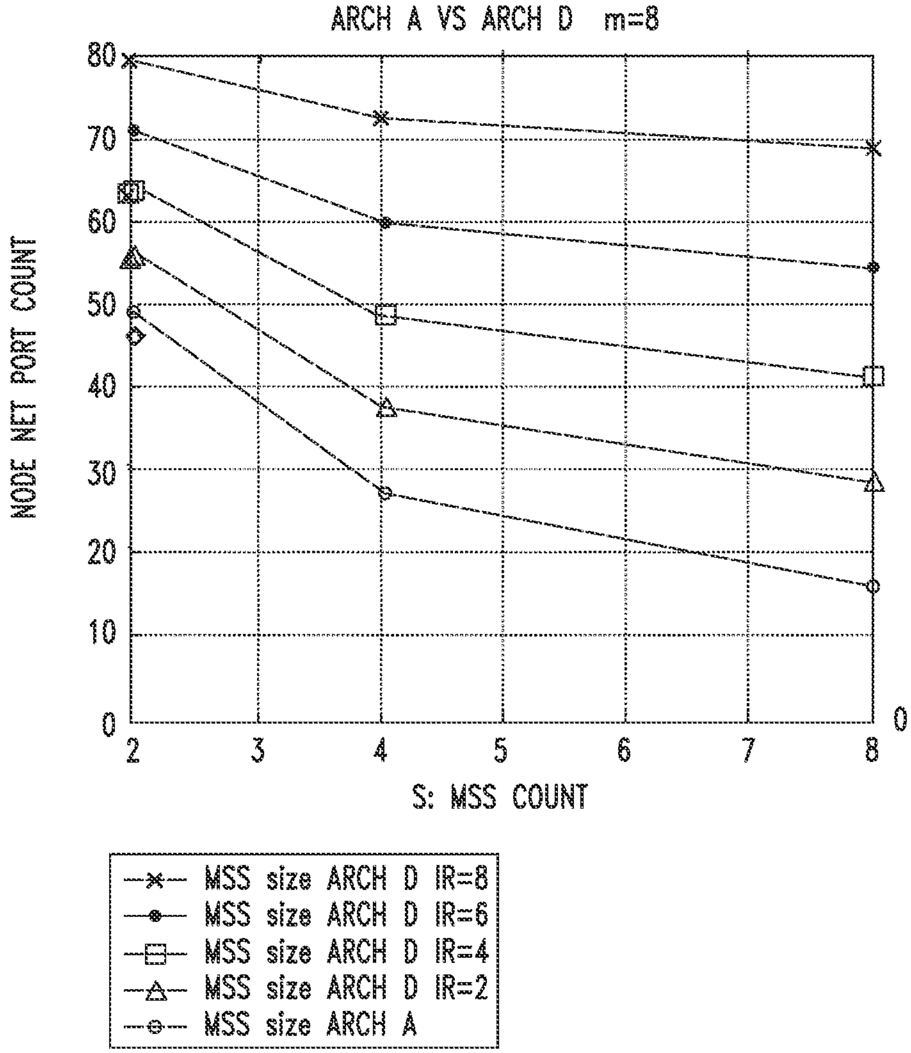

FIGS. 7A-7B depict middle stage switch (MSS) count comparisons for the optical cross-connect architecture of FIG. 2 (denoted as Arch A) as compared again the optical cross-connect architecture of FIG. 4 (denoted as Arch C) and the optical cross-connect architecture of FIG. 5 (denoted as Arch D).

FIG. 7A depicts MSS count comparisons for the optical cross-connect architecture of FIG. 2 (denoted as Arch A) as compared again the optical cross-connect architecture of FIG. 4 (denoted as Arch C), as well as auxiliary optical switch size results for the optical cross-connect architecture of FIG. 4 (denoted as Arch C). In FIG. 7A, the graph 710 illustrates changes in the optical node net port count of an optical node for Arch A and Arch C when m (the number of fibers per direction) is equal to 8 (i.e., m=8). In the graph 710 of FIG. 7A, the x-axis indicates the MSS count of the optical node, and the y-axis indicates how the optical node net port count changes with changes in the MSS count. As illustrated by the graph 710 of FIG. 7A, the Arch C provides flexibility in growing inter-MSS connectivity based on use of the auxiliary optical switch.

FIG. 7B depicts MSS count comparisons for the optical cross-connect architecture of FIG. 2 (denoted as Arch A) and the optical cross-connect architecture of FIG. 5 (denoted as Arch D). In FIG. 7B, the graph 720 illustrates changes in the optical node net port count of an optical node for Arch A and Arch D when m (the number of fibers per direction) is equal to 8 (i.e., m=8). In the graph 720 of FIG. 7B, the x-axis indicates the MSS count of the optical node, and the y-axis indicates how the optical node net port count changes with changes in the MSS count. As illustrated by the graph 720 of FIG. 7B, the Arch D has less flexibility in supporting inter-MSS connectivity, but achieves improved levels of inter-MSS connectivity with a relatively low cost.

In FIGS. 7A-7B, it may be seen that Arch C is more flexible than Arch D on growing the inter-MSS connectivity, but it comes at the cost of an additional switch with a size that increases linearly with S (continuous line). This may be seen from the fact that, in Arch C, each step in IR represents an additional fiber pair to the auxiliary optical switch, whereas, in Arch D (full mesh), the growth step is (S−1) fiber pairs. This indicates that Arch C provides more flexibility on middle stage connectivity size at the cost of the additional auxiliary optical switch and, thus, as indicated above, Arch C is more flexible than Arch D on growing the inter-MSS connectivity at the cost of an additional switch with a size that increases linearly with S (continuous line).

Figure 9:
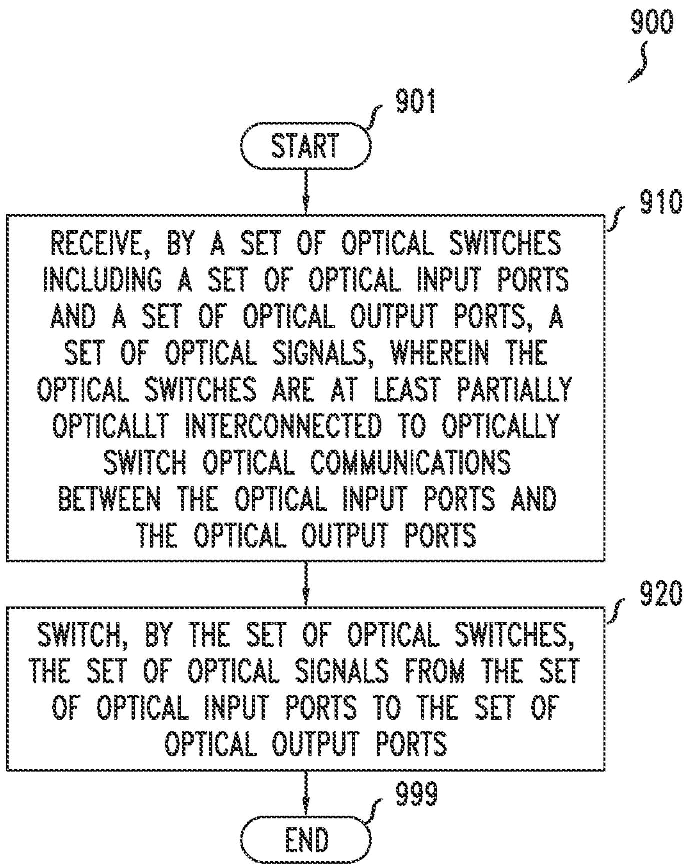
FIG. 9 depicts an example embodiment of a method for use in optically directing optical communications between optical fibers and/or cores of optical fibers based on an optical node configured with an optical cross-connect architecture that is configured to support switching of optical communications between optical fibers and/or cores of optical fibers.

It will be appreciated that, although primarily presented with respect to use of specific cross-connect architectures in optical nodes in order to provide improved connectivity between middle stage switches of the optical nodes in a manner that supports switching of optical communications between optical fibers and/or cores of optical fibers, various other types of cross-connect architectures may be employed within optical nodes in order to provide improved connectivity between middle stage switches of the optical nodes in a manner that supports switching of optical communications between optical fibers and/or cores of optical fibers (e.g., redundant full mesh full-duplex topologies, partial mesh full duplex topologies, ring topologies as presented with respect to FIG. 9, or the like, as well as various combinations thereof).

Figure 8:
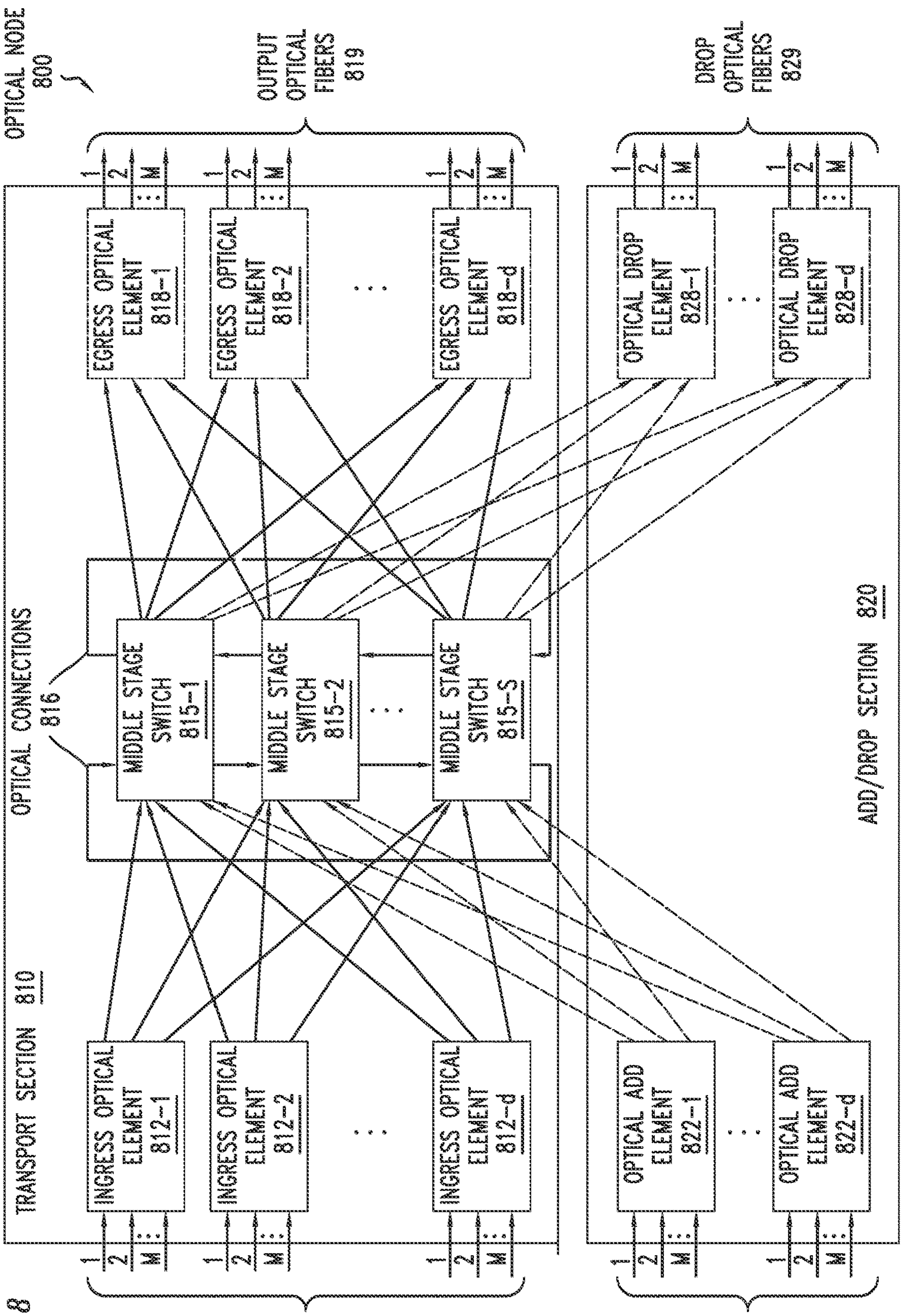
FIG. 8 depicts an example embodiment of an optical node configured with an optical cross-connect architecture, including a Clos node architecture that includes direct interconnections between middle stage switches based on a ring topology, which is configured to support switching of optical communications between optical fibers and/or cores of optical fibers.

FIG. 8 depicts an example embodiment of an optical node configured with an optical cross-connect architecture, including a Clos node architecture that includes direct interconnections between middle stage switches based on a ring topology, which is configured to support switching of optical communications between optical fibers and/or cores of optical fibers.

As depicted in FIG. 8, optical node 800 is similar to the optical node 200 of FIG. 2, with the exception that the middle stage is augmented to support increased connectivity between the middle stage switches. In the transport section

810, the optical node 800 includes a set of ingress optical elements 812-1 to **812-*d* (collectively, ingress optical elements 812) supporting a set of input optical fibers 811, a set of egress optical elements 818-1 to 818-*d* (collectively, egress optical elements 818) supporting a set of output optical fibers 819, and a set of middle stage switches 815-1 to 815-*s* (collectively, middle stage switches 815) disposed between the ingress optical elements 812 and the egress optical elements 818 for switching optical signals between the input optical fibers 811 and the output optical fibers 819 and also connected to the add/drop section 820 for supporting adding/dropping of optical signals at the optical node 800. In the add/drop section 820, the optical node 800 includes a set of optical add elements 822-1 to 822-*d* (collectively, optical add elements 822) associated with add optical fibers 821 and configured to locally add optical signals via the middle stage switches 815 for adding optical signals for transmission via the output optical fibers 819 and also includes a set of optical drop elements 828-1 to 828-*d* (collectively, optical drop elements 828) configured to locally drop optical signals via the middle stage switches 815 for dropping optical signals received via the input optical fibers 811**.

As depicted in FIG. 8, the middle stage is augmented to support increased connectivity between the middle stage switches 815 based on use of optical connections 816 between the middle stage switches 815 that provide direct connections between adjacent ones of the middle stage switches 815. The middle stage is configured such that there is full duplex connectivity between the adjacent ones of the middle stage switches 815 based on the optical connections 816 (illustratively, a first ring of optical connections 816 connects adjacent ones of the middle stage switches 815 in a first direction and a second ring of optical connections 816 connects adjacent ones of the middle stage switches 815 in a second direction). As illustrated in FIG. 8, in the middle stage, each of the middle stage switches 815 includes a set of input ports (connected to input optical fibers 811 via the ingress optical elements 812 and connected to the add optical fibers 821 via the optical add elements 822) and a set of output ports (connected to output optical fibers 819 via the egress optical elements 818 and connected to the drop optical fibers 829 via the optical drop elements 828), which can be interconnected via a set of optical interconnection ports on the middle stage switch 815 that connect the middle stage switch 815 to a pair of other middle stage switches 515 adjacent to the middle stage switch 815 in a bidirectional ring topology). In this architecture, optical signals traversing the middle stage can be switched from any middle stage switch 815 to any other middle stage switch 815 via the rings of optical connections 816, thereby enabling optical signals to be switched from any input optical fiber 811 to any output optical fiber 819, from any input optical fiber 811 to any drop optical fiber 829 on any optical drop element 828, and from any add optical fiber 821 on any optical add element 822 to any output optical fiber 819. The use of the optical connections 816 to provide full duplex optical connectivity between adjacent ones of the middle stage switches 815 reduces the blocking probability of the optical node 800.

In the optical node 800, like the egress optical elements 218 of FIG. 2 which are simple pass-through elements that connect the output ports of the middle stage switches 215 to the output optical fibers 219 and unlike the egress optical elements 318 of FIG. 3 which are implemented as optical switches, the egress optical elements 818 of FIG. 8 are simple pass-through elements that connect the output ports of the middle stage switches 815 to the output optical fibers 819 and the optical connections 816 provide increased flexibility in connecting the output ports of the middle stage switches 815 to the output optical fibers 819 (and, thus, increased flexibility in connecting various input optical fibers 811 to various output optical fibers 819) without requiring the use of optical switches as the egress optical elements 818. Thus, it will be appreciated that the use of the optical connections 816 in the middle stage to provide improved connectivity between the input optical fibers 811 and the output optical fibers 819 reduces the blocking probability without incurring the expense of using optical switches as the egress optical elements as in the optical node 300 of FIG. 3.

FIG. 9 depicts an example embodiment of a method for use in optically directing optical communications between optical fibers and/or cores of optical fibers based on an optical node configured with an optical cross-connect architecture that supports switching of optical communications between optical fibers and/or cores of optical fibers. At block 901, the method 900 begins. At block 910, receive, by a set of optical switches including a set of optical input ports and a set of optical output ports, a set of optical signals, wherein the optical switches are at least partially optically interconnected to optically switch optical communications between the optical input ports and the optical output ports. At block 920, switch, by the set of optical switches, the set of optical signals from the set of optical input ports to the set of optical output ports. At block 999, the method 900 ends.

It will be appreciated that, although primarily presented with respect to example embodiments in which the optical node includes a set of input optical switches, in at least some example embodiments the optical node may not include input optical switches. In at least some example embodiments, for example, the optical node may be implemented using a two-stage architecture that includes the set of middle stage switches and the set of egress optical switches, and the set of input optical switches may be omitted (e.g., the input optical fibers may be directly connected to the middle stage switches via respective ports or connectors). In at least some example embodiments, for example, the optical node may be implemented using a one-stage architecture that includes the set of middle stage switches, and the set of input optical switches may be omitted (e.g., the input optical fibers may be directly connected to the middle stage switches via respective ports or connectors) and the set of output optical switches may be omitted (e.g., the middle stage switches may be directly connected to the output optical fibers via respective ports or connectors).

It will be appreciated that, although primarily presented with respect to example embodiments in which Clos architectures are implemented within the optical nodes (e.g., each of the optical nodes is implemented using a multi-stage Clos architecture, such as a two-stage Clos architecture or a three-stage Clos architecture), in at least some example embodiments one or more of the optical nodes in an optical network may be implemented using a single stage of optical switches (e.g., the middle stage switches presented herein, such as where the middle stage switches are directly connected to optical input fibers of the node without use of a stage of ingress optical switches and the middle stage switches are directly connected to optical output fibers of the nodes without use of a stage of optical output switches). It also will be appreciated that, where one or more of the optical nodes in an optical network is implemented using a single stage of optical switches, various combinations of optical nodes within the optical network may provide multiple stages of optical switches forming Clos architectures within the optical network even though Clos architecture may not be realized internally within one or more of the optical nodes of the optical network (e.g., an optical Clos network may be realized in a more distributed manner across a set of optical nodes, such as where one or more optical nodes may include optical elements that operate as an ingress stage of the optical Clos network, one or more optical nodes may include optical elements that operate as a middle stage of the optical Clos network, and one or more optical nodes may include optical elements that operate as an egress stage of the optical Clos network).

It will be appreciated that, although primarily presented with respect to example embodiments in which multiple spatial lanes for SDM are provided using bundles of uncoupled single-mode fibers (e.g., where the single-mode fibers are coupled to the inputs and outputs of the various optical switches in the optical node architecture), the multiple spatial lanes for SDM optical systems supporting such example embodiments may be implemented in various ways. For example, the multiple spatial lanes may be provided using cables that bundle multiple strands of uncoupled single-mode fibers, using fibers that include multiple uncoupled cores, or the like, as well as various combinations thereof. For example, where multi-core optical fibers are used for spatial lanes, fan-in-fan-out (FIFO) devices may be used to adapt the optical switches in the optical node architecture to use of the multi-core optical fibers. It will be appreciated that various other devices or elements may be employed to adapt the optical switches in the optical node architecture to use of various types of spatial lanes which may be used for SDM optical systems.

It will be appreciated that, although primarily presented with respect to example embodiments in which the optical nodes of the optical network support propagation of optical signals within the optical nodes using optical fibers or optical fiber cores, in at least some example embodiments the optical nodes of the optical network may support propagation of optical signals within the optical nodes using various other optical signal propagation mechanisms. In at least some example embodiments for example, one or more of the optical nodes of the optical network may support propagation of optical signals internally using free-space optical propagation, such as based on free-space optical propagation of optical signals from input optical ports (e.g., input optical ports of the optical node or optical ports disposed at the outputs of ingress optical switches of the optical node) to input optical ports of the middle stage switches and/or free-space optical propagation of optical signals from the output optical ports of middle stage optical switches to output optical ports (e.g., output optical ports of the optical node or optical ports disposed at the inputs of egress optical switches of the optical nodes).

It will be appreciated that, although primarily presented with respect to specific configurations of the optical nodes that support optical switching of optical communications, various optical nodes configured to support optical switching of optical communications may be described more generally. For example, an apparatus may include an optical node (e.g., an optical switch, an optical add/drop node, a spatial multiplexer, or the like) configured to optically switch optical communications between a set of optical input ports and a set of optical output ports. For example, an apparatus may include an optical node (e.g., an optical switch, an optical add/drop node, a spatial multiplexer, or the like) configured to optically switch optical communications between a set of optical input ports and a set of optical output ports such that any of the optical input ports may be connected to any of the optical output ports. For example, an apparatus may include a set of optical switches including a set of optical input ports and a set of optical output ports, wherein the optical switches are at least partially optically interconnected to optically switch optical communications between the optical input ports and the optical output ports. For example, an optical switching stage may include a set of optical input ports, a set of optical output ports, and two or more optical switches, wherein each respective optical switch of the two or more optical switches includes a set of optical input ports, a set of optical output ports, one or more additional optical input ports, and one or more additional optical output ports, wherein the set of optical input ports of the respective optical switch is a subset of, or is optically connected to, the set of optical input ports of the optical switching stage, wherein the set of optical output ports of the respective optical switch is a subset of, or is optically connected to, the set of optical output ports of the optical switching stage, and wherein each of the additional optical output ports of the respective optical switch is optically connected, or optically connectable, to one of the additional optical input ports of one of the other optical switches of the two or more optical switches. It will be appreciated that the apparatus may include various other elements as presented herein.

It will be appreciated that, although primarily presented with respect to specific functions performed by optical nodes to support optical switching of optical communications between a set of optical input ports and a set of optical output ports, various functions performed by optical nodes to support optical switching of optical communications between optical input ports and optical output ports may be described more generally. For example, a method may include optically directing optical communications between a set of optical input ports and a set of optical output ports. For example, a method may include receiving, by a set of optical switches including a set of optical input ports and a set of optical output ports, a set of optical signals, wherein the optical switches are at least partially optically interconnected to optically switch optical communications between the optical input ports and the optical output ports and switching, by the set of optical switches, the set of optical signals from the set of optical input ports to the set of optical output ports.

Various example embodiments for supporting improved connectivity within optical nodes of optical transport systems may provide various advantages or potential advantages. For example, various example embodiments for supporting improved connectivity within optical nodes of optical transport systems may be configured provide improved spatial multiplexing in the optical transport networks. For example, various example embodiments for supporting improved connectivity within optical nodes of optical transport systems may be configured to reduce connection blocking probabilities at the optical node level in the optical transport systems. For example, various example embodiments for supporting improved connectivity within optical nodes of optical transport systems may be configured to provide scalable optical switches, based on modular, modified Clos-type architectures, that can grow with network requirements (e.g., various optical node architectures presented herein enable building of large port count optical switches from smaller size optical switched), that can avoid a single point of failure by creating independent failure regions, and so forth. For example, various example embodiments for supporting improved connectivity within optical nodes of optical transport systems may be configured to reduce connection blocking probabilities at the optical node level in the optical transport systems with, depending on the reference optical node architecture used as the basis for the comparison, relatively small increases in costs of the optical nodes in the optical transport systems (e.g., as compared with Arch A) or even reductions in costs of the optical nodes (e.g., as compared with Arch B). It will be appreciated that various example embodiments for supporting improved connectivity within optical nodes of optical transport systems may provide various other advantages or potential advantages.

Figure 10:
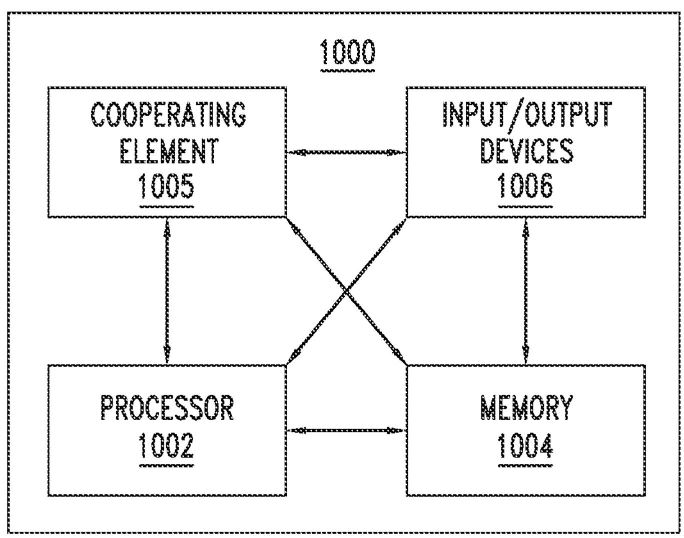
FIG. 10 depicts an example embodiment of a computer suitable for use in performing various functions presented herein.

FIG. 10 depicts an example embodiment of a computer suitable for use in performing various functions presented herein.

The computer 1000 includes a processor 1002 (e.g., a central processing unit (CPU), a processor, a processor having a set of processor cores, a processor core of a processor, or the like) and a memory 1004 (e.g., a random access memory, a read only memory, or the like). The processor 1002 and the memory 1004 may be communicatively connected. In at least some example embodiments, the computer 1000 may include at least one processor and at least one memory including instructions that, when executed by the at least one processor, cause the computer to perform various functions presented herein.

The computer 1000 also may include a cooperating element 1005. The cooperating element 1005 may be a hardware device. The cooperating element 1005 may be a process (e.g., computer program code and associated data structures) that can be loaded into the memory 1004 and executed by the processor 1002 to implement various functions presented herein (in which case, for example, the cooperating element 1005 (including associated data structures) can be stored on a non-transitory computer-readable storage medium, such as a storage device or other suitable type of storage element (e.g., a magnetic drive, an optical drive, or the like)).

The computer 1000 also may include one or more input/output devices 1006. The input/output devices 1006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1000 may represent a general architecture and functionality suitable for implementing functional elements described herein, portions of functional elements presented herein, combinations of functional elements presented herein, or the like, as well as various combinations thereof. For example, computer 1000 may provide a general architecture and functionality that is suitable for implementing one or more devices presented herein, such as an optical node or portion thereof, a controller or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer program code, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An optical switching stage, comprising:

a set of optical input ports, a set of optical output ports, and

S optical switches, numbered 1 to S, wherein S≥3, wherein each respective optical switch of the S optical switches comprises:

a set of optical input ports, a set of optical output ports, one or more additional optical input ports, and one or more additional optical output ports, wherein the set of optical input ports of the respective optical switch is a subset of, or is optically connected to, the set of optical input ports of the optical switching stage, wherein the set of optical output ports of the respective optical switch is a subset of, or is optically connected to, the set of optical output ports of the optical switching stage, and wherein each of the additional optical output ports of the respective optical switch is optically connected, or optically connectable, to one of the additional optical input ports of one of the other optical switches of the S optical switches, and wherein for every J from 1 to S:

a first additional optical output port of the one or more additional optical output ports of optical switch J is optically connected to a first additional optical input port of the one or more additional optical input ports of optical switch J+1, where J+1 is defined as 1 when J equals S.

2. The optical switching stage according to claim 1, wherein for every J from 1 to S:

a second additional optical output port of the one or more additional optical output ports of optical switch J is optically connected to a second additional optical input port of the one or more additional optical input ports of optical switch J−1, where J−1 is defined as S when J equals 1.

3. The optical switching stage according to claim 2, wherein for every J from 1 to S:

optical switch J is not optically connected to any one of the S optical switches other than optical switches J+1 and J−1.

* * * * *